United States Patent [19]
Rohrberg et al.

[11] Patent Number: 5,440,477
[45] Date of Patent: Aug. 8, 1995

[54] MODULAR BOTTLE-MOUNTED GAS MANAGEMENT SYSTEM

[75] Inventors: Roderick G. Rohrberg, Torrance; Russell D. Young, Redondo Beach; Timothy K. Rohrberg, Torrance, all of Calif.

[73] Assignee: Creative Pathways, Inc., Torrance, Calif.

[21] Appl. No.: 56,216

[22] Filed: Apr. 30, 1993

Related U.S. Application Data

[63] Continuation-in-part of Ser. No. 702,856, May 20, 1991, abandoned.

[51] Int. Cl.6 ............................................. G05B 15/00
[52] U.S. Cl. ................................. 364/188; 364/510; 137/588
[58] Field of Search ............. 219/69 G; 222/127, 135; 364/510, 509, 558, 141, 143, 569, 468; 604/246; 137/15, 561, 587, 588, 589, 583–584; 365/52; 98/32

[56] References Cited

U.S. PATENT DOCUMENTS

| | | | |
|---|---|---|---|
| 4,361,745 | 11/1982 | Rupert et al. | 219/69 G |
| 4,502,130 | 2/1985 | Kuckuk | 365/52 |
| 4,512,377 | 4/1985 | Greer | 141/11 |
| 4,625,627 | 12/1986 | Livanos et al. | 98/32 |
| 4,917,136 | 4/1990 | Ohmi et al. | 137/15 |
| 4,989,160 | 1/1991 | Garrett et al. | 364/509 |
| 5,142,483 | 8/1992 | Basham et al. | 364/510 |
| 5,256,157 | 10/1993 | Samiotes et al. | 604/246 |

Primary Examiner—James P. Trammell
Attorney, Agent, or Firm—Anglin & Giaccherini

[57] ABSTRACT

A *Modular Bottle-Mounted Gas Management System* (10) that overcomes the problems encountered by previous gas cabinet equipment is disclosed. The present invention comprises a complete gas manifold (22) that includes computer-controlled valves, actuators, regulators and transducers. The entire system resides within a housing (11) that sits atop a conventional gas bottle (12) that would normally be enclosed within a gas cabinet (25) that is many times the volume of the *Modular Bottle-Mounted Gas Management System* 10. Outside the housing (11), an upper control panel (13) contains an LCD display (14) and a lower control panel (15) holds a keypad control (16), a removable data pack (17), LED indicator lights (18), and an emergency shut-off switch (19). Inside the housing (11), a bottle neck (20) protrudes up from the gas bottle (12) and provides a connection for a supply of gas within it to a gas manifold (22). The gas manifold (22) is an assembly of valves, actuators, pressure regulators, welded fittings, and transducers. The top of the housing (11) is fitted with a process gas outlet (21a), a vent connection (21b), a nitrogen inlet (21c), and a bottle access cover (21d). The top portion of the hinged housing (11) may be swung open to provide access to the gas manifold (22). The present invention provides safe handling of toxic, corrosive, and pyrophoric gases in a double-containment vessel. It utilizes component-to-component welds (65) to allow for the absolute reduction of the size of the manifold (22) while simultaneously reducing the number of mechanical connections. This advanced design delivers unprecedented levels of cleanliness by minimizing the number of particulate traps within the manifold (22).

9 Claims, 22 Drawing Sheets

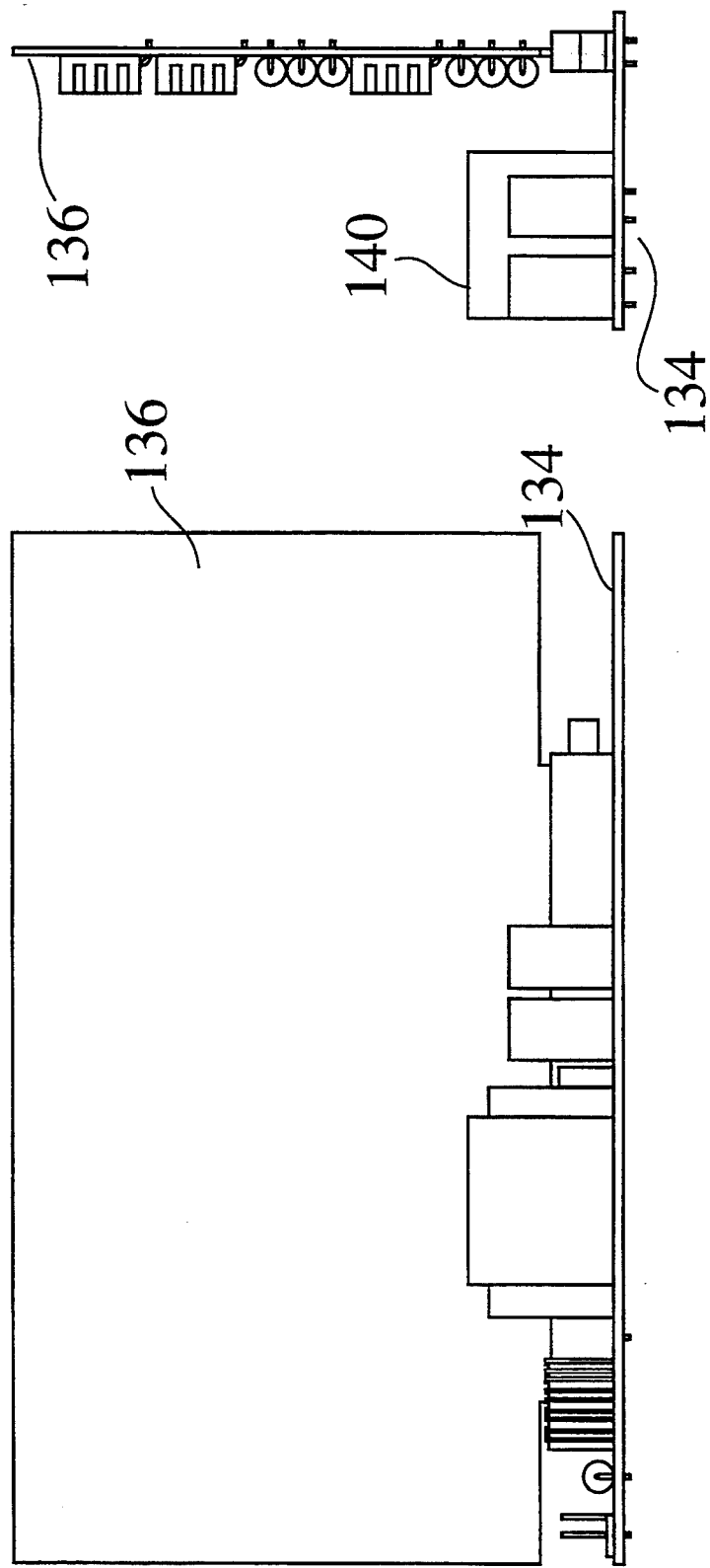

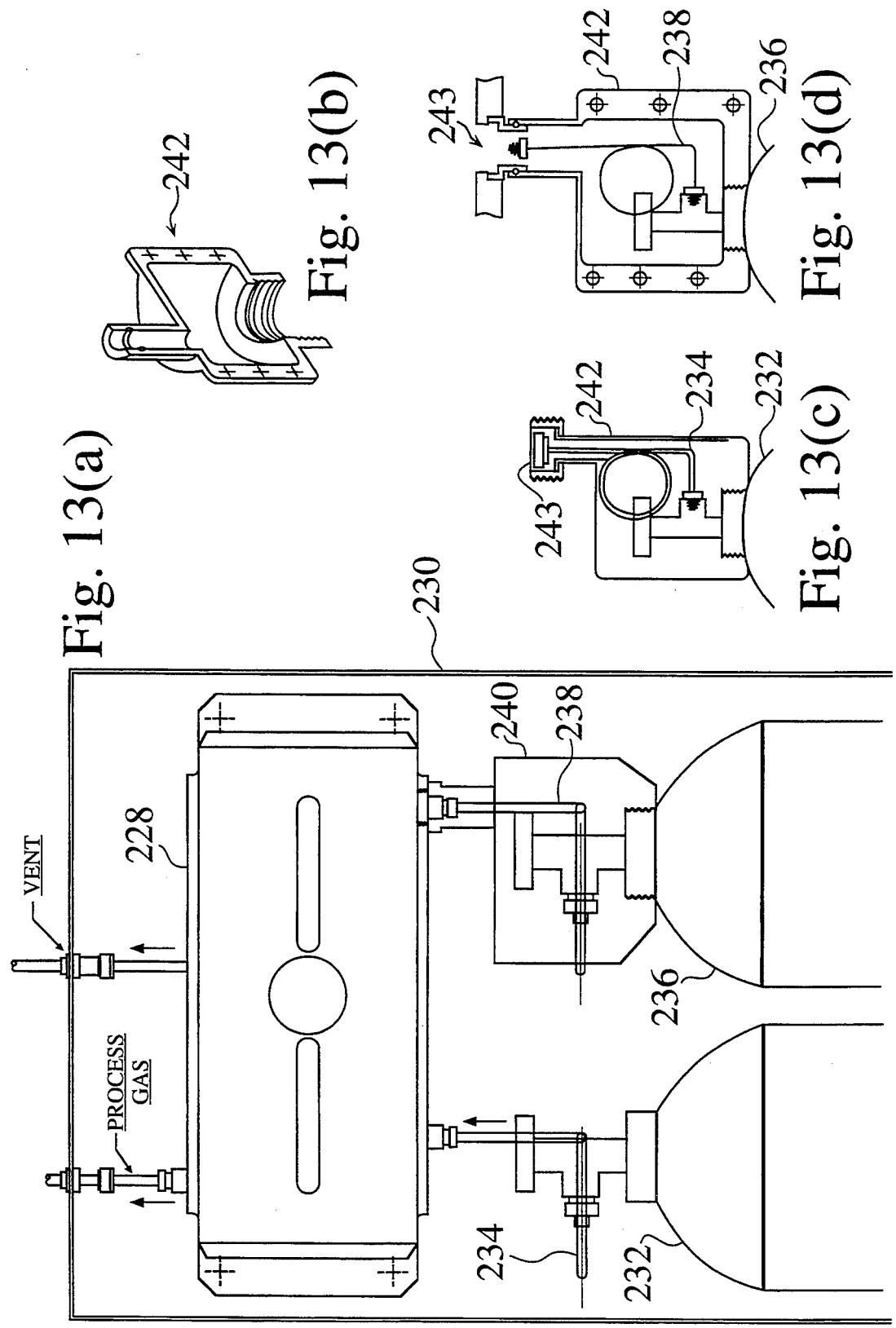

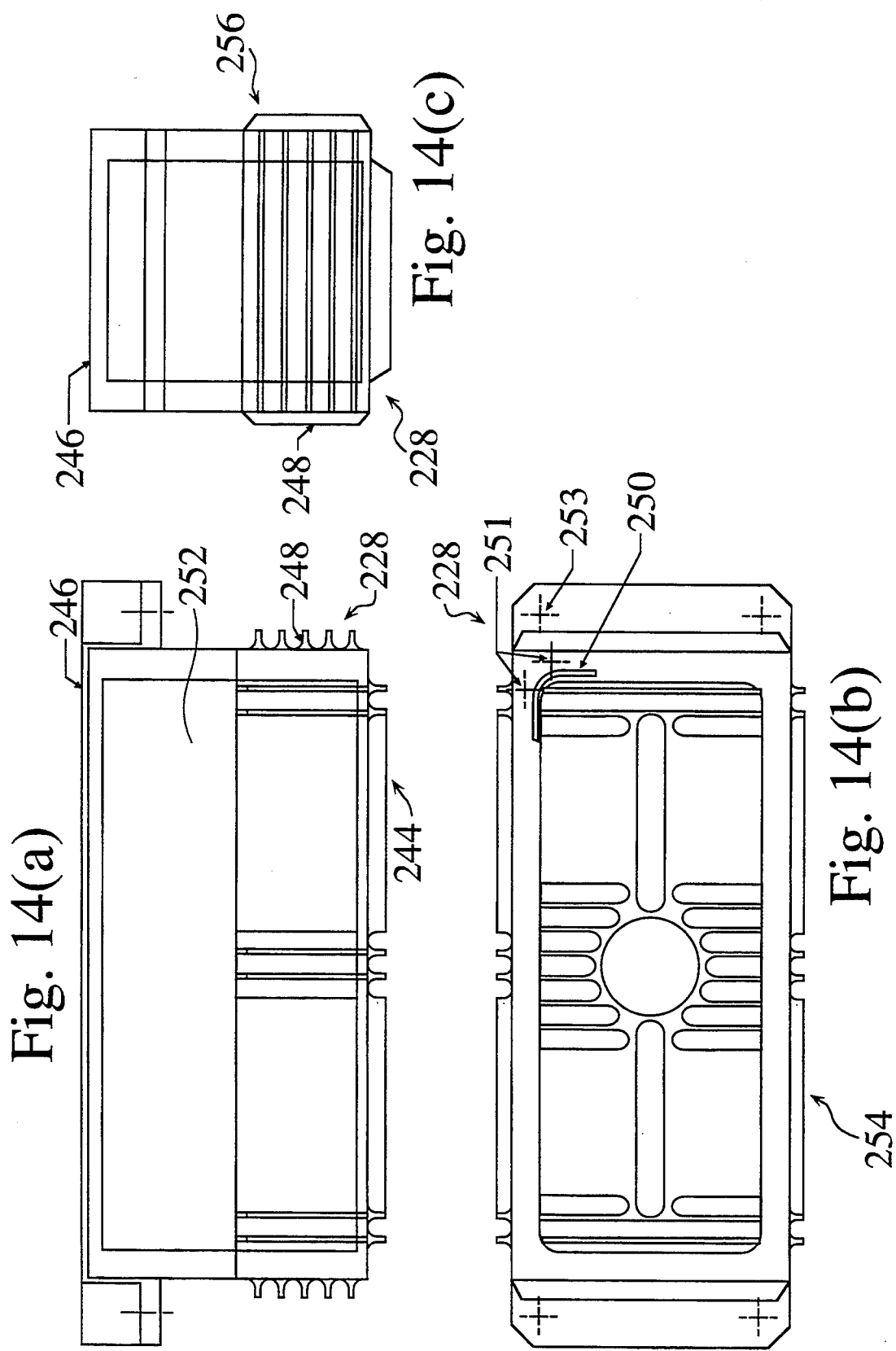

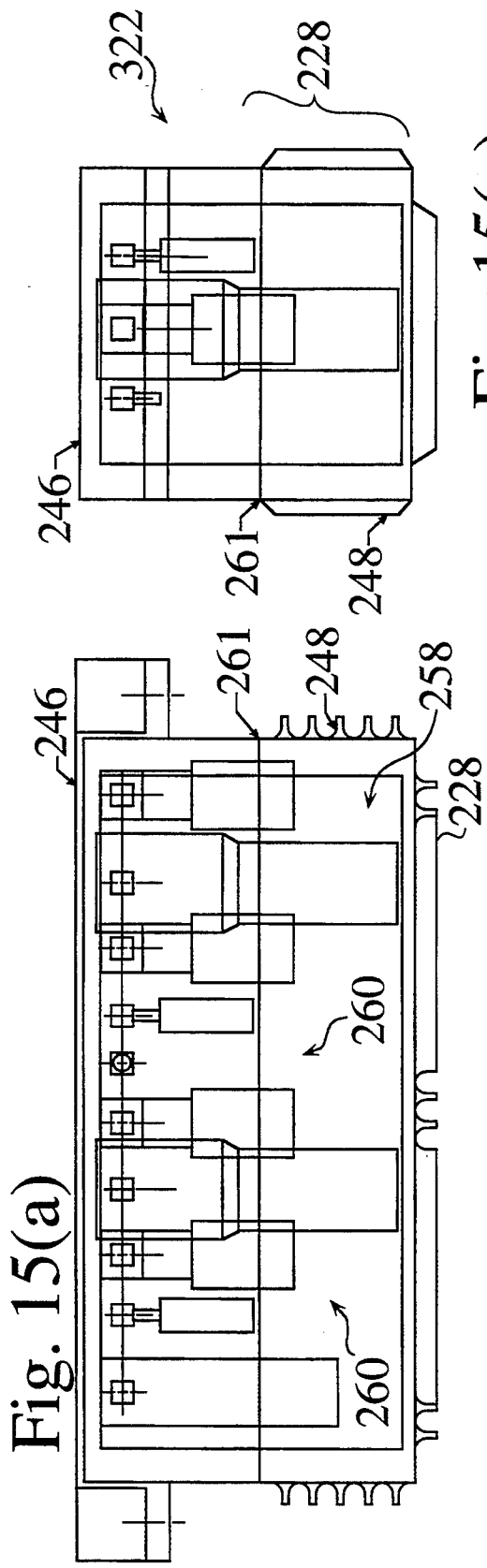
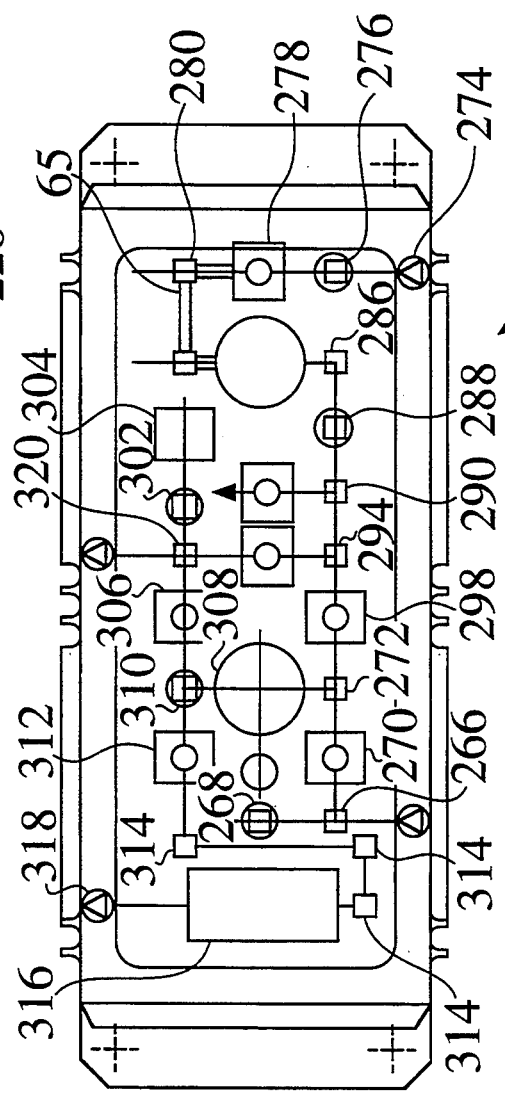
Fig. 15(a)
Fig. 15(b)
Fig. 15(c)

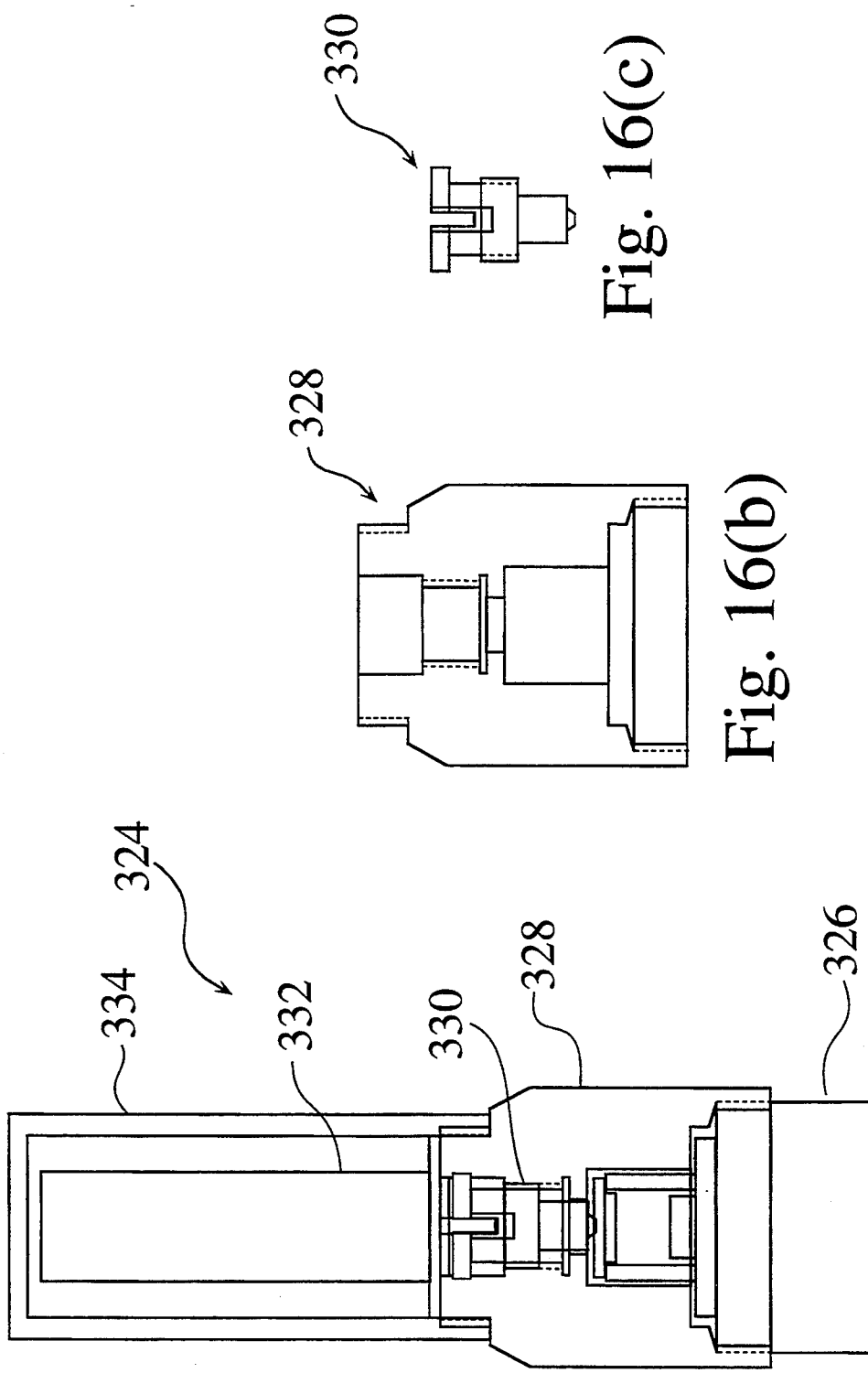

346

5,440,477

MODULAR BOTTLE-MOUNTED GAS MANAGEMENT SYSTEM

CLAIM FOR PRIORITY

The Applicants hereby claim the benefit of priority under Sections 119 and 120 of Title 35 of the United States Code of Laws for any and all subject matter which is commonly disclosed in the present application and in pending patent application entitled *Bottle-Mounted Cube* by Roderick G. Rohrberg et al., filed on May 20, 1991 and assigned U.S. Ser. No. 07/702,856. This is a CIP of U.S. Ser. No. 07/702,856, now abandoned.

FIELD OF THE INVENTION

The present invention is a system that provides an intelligent gas control system. *The Modular Bottle-Mounted Gas Management System* is a clean, efficient, and reliable gas management device that provides all the features of previous gas cabinets in a revolutionary safe and serviceable micro-miniature design.

BACKGROUND OF THE INVENTION

Many industrial processes require equipment that is capable of automatically controlling supplies of gases and fluids. The fabrication of integrated circuits generally includes a process such as chemical vapor deposition in which a variety of heated gases is introduced into a partially evacuated chamber confining a semiconductor substrate. By carefully managing the temperature and pressure within this enclosure, various layers of conductive, insulative, and semiconductive materials are grown on the substrate to create the three-dimensional circuit patterns of an integrated circuit. All of the substances that are transported in and out of the chamber must be constantly monitored, since the proportions of the different reactants that constitute the vapor atmosphere ultimately determine the physical dimensions of the transistors, capacitors, and resistors that will collectively comprise a single, vast electrical circuit on a tiny chip of silicon. One of the greatest causes of failures of finished integrated circuits is attributable to microscopic dust particles that contaminate the workspace where the chip is manufactured. Since even one tiny foreign body can ruin a very expensive chip, semiconductor makers fabricate their products in a "clean room" environment that guards against such contamination. The air which is admitted into a clean room is first passed through an extensive filtration system that virtually eliminates unwanted dust particles. Technicians who work within these facilities wear special clothing and masks that prevent the introduction of substances that would interfere with their meticulous work. The cost of building, maintaining, and operating this highly specialized environment is enormous. Consequently, all the space within a clean room must be utilized as efficiently as possible. All the equipment that is used within the confines of the clean room should occupy as small a volume as is practical. In addition to this critical need for miniaturization, the chemicals employed in the vapor deposition method must be housed and conveyed with great care. The solvents, acids, oxidizing agents, and other substances used in the semiconductor laboratory are often caustic or toxic. The devices that are selected to conduct these potentially hazardous materials should be capable of providing reliable service free from wear, corrosion, or leakage.

In U.S. Pat. No. 4,989,160, Garrett et al. applied modular process control hardware to rather conventional gas control devices, using widely accepted instrumentation and control techniques. While such methods begin to deal with some of the improvements needed in gas management control, they have failed to address many of the design shortcomings of gas management systems.

Gas manifolds in present systems commonly use stainless alloy tubing and swaged fittings to supply the connections between manifold components, such as valves, regulators, and pressure sensors. These complex assemblies of tubing and fittings suffer from a high parts count. The gas manifolds are large and bulky, and the large, internal gas volume results in large purge times, with an excess waste of costly purge gases. The large volumes of potentially hazardous process gases to be purged create safety and disposal problems when the process gases are purged from the system. Tubing and fitting assemblies are also prone to leakage from improper assembly, service, or damage during use.

Previous solutions such as those offered by Garrett et al. have also failed to improve upon the safety, cost, and extensive downtime for the service of manifolds or controls. These systems are installed integrally within the large gas system containment cabinets. When preventative maintenance, calibration or repair is required, the system cabinet must be taken off line for a prolonged period of time. Service personnel are then required to perform all service tasks with the equipment in position, within the clean-room environment. This is an inefficient environment for equipment service, and can pose safety risks from exposure to process gases during this service interval.

Since the entire manifold and control are integral with the cabinet, the increased risk of contamination to the clean-room area by these non-manufacturing service activities is unavoidable. Should a particular gas cabinet be disabled for a prolonged period, the only way that manufacturing can be resumed in areas that had relied upon that gas management device is if another large and costly gas cabinet has been installed to provide appropriate levels of redundancy.

Previous gas cabinet systems that have been incorporated into chip fabrication systems have served the needs of semiconductor manufacturers adequately, but at a high cost in terms of the great space and volumes that they occupy. The shortcomings of conventional gas control devices has presented a major challenge to designers in the field of industrial controls. The development of a miniaturized, modular, safe, and clean gas management system that provides intelligent automated control for integrated circuit fabrication would constitute a major technological advance. The enhanced performance that could be achieved using such an innovative device would satisfy a long felt need within the computer industry.

SUMMARY OF THE INVENTION

The *Modular Bottle-Mounted Gas Management System* disclosed and claimed in this patent application is a miniature gas management system that overcomes the problems encountered by previous gas cabinet equipment. The present invention comprises a complete gas manifold that includes computer-controlled valves, actuators, regulators and transducers. The entire system resides within a housing that sits atop a conventional gas bottle that would normally be enclosed within a gas cabinet. The present invention includes an LCD display screen that continuously presents all current pressures within the system when it is not being cycled. The screen gives step by step procedures and warnings of any unsuccessful checks to the operator. The screen is coupled to LED indicator lights for viewing the status of the system. A removable 8K-byte EEPROM data pack which stores information about the gas control procedure is inserted in a socket in the front panel of the housing. The data pack allows only qualified personnel to access purge cycling and maintains a constant log of cycling operations and operators. An emergency shut off valve is also located on the front panel. This innovative configuration is designed for use as a stand-alone unit or may be controlled by a link to a remote computer.

The *Modular Bottle-Mounted Gas Management System* is a modular unit that is nearly twenty times smaller than previous equipment which is capable of performing equivalent functions. The present invention automatically cycles and directs the flow of process and purge gases to an industrial operation. The greatly diminished volume of the unit reduces the amount of process gas in the system at any given time, compared to the amounts of gas held in much larger conventional gas cabinets. This reduction of total volume keeps the time it takes to evacuate the system at a minimum, and results in a much safer gas management system.

The present invention provides safe handling of toxic, corrosive, and pyrophoric gases in a double-containment vessel. It utilizes component-to-component welds throughout the gas manifold, which allows for the absolute reduction of the size of the manifold while simultaneously reducing the number of mechanical connections. This advanced design delivers unprecedented levels of cleanliness by minimizing the number of particulate traps within the manifold. The invention employs a housing that affords quick and easy installation and modification. The top portion of the *Modular Bottle-Mounted Gas Management System* is hinged and swings open for easy access, service, and trouble-shooting. This lightweight unit is easy to transport and handle.

An on-board memory stores system variables which can be accessed by the user. The CPU controlled system constantly monitors the status of the gas transfer operation and also provides self-diagnostic and leak-checking functions.

The present invention incorporates the latest miniaturized connector technology in a package that is safe and reliable. This invention will become the standard-bearer for sub-micron integrated circuit technology and constitutes a major step forward in the field of industrial controls.

An appreciation of other aims and objectives of the present invention and a more complete and comprehensive understanding of this invention may be achieved by studying the following description of a preferred embodiment and by referring to the accompanying drawings.

BRIEF DESCRIPTION OF THE DRAWINGS

FIGS. 10(a) and (b) present front and side views of the stand-alone slave computer board that controls the operation of the present invention.

FIG. 12 is an overhead view of the motherboard that is coupled to the slave computer boards shown in. FIGS. 10(a) and (b).

FIGS. 13(a), (b),(c) and (d) are illustrations showing an alternate embodiment of the present invention, the Containerized Controller.

FIGS. 14(a), (b), and (c) are top, front, and side views of the exterior of the Containerized Controller.

FIGS. 15(a), (b), and (c) are detailed top, front, and side views of the exterior and interior of the Containerized Controller.

FIGS. 16(a), (b) and (c) present detailed views of the regulator mechanism used in the present invention.

DETAILED DESCRIPTION OF A PREFERRED EMBODIMENT

Figure 1A:
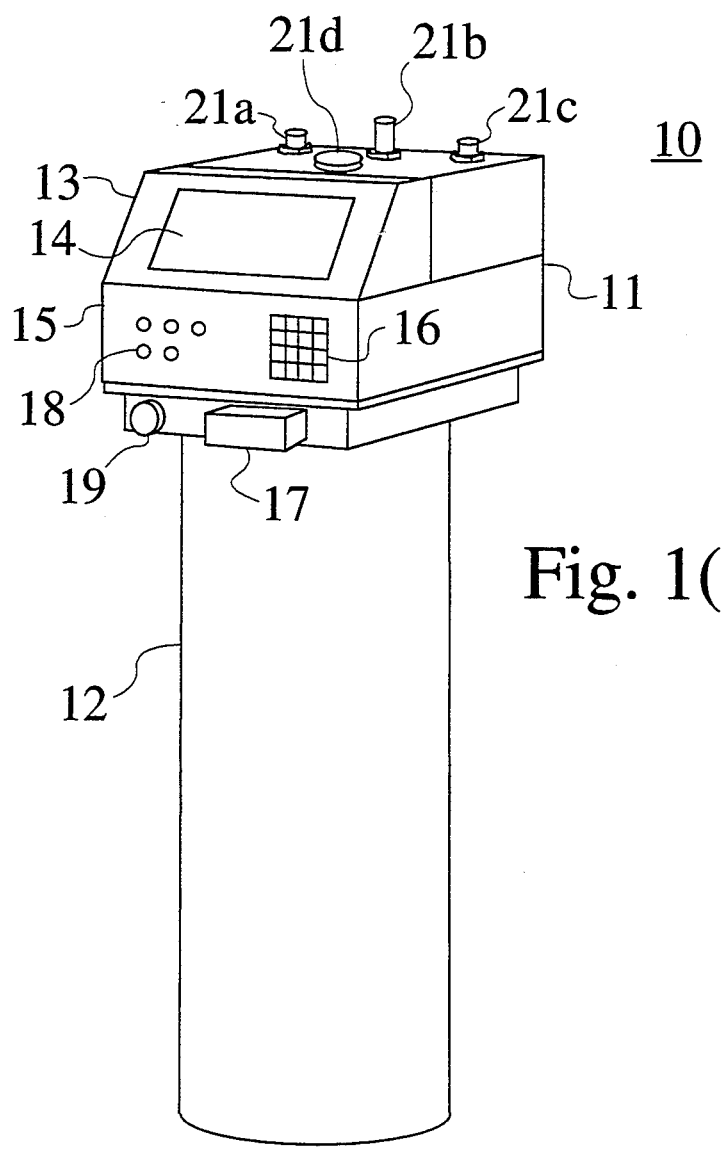
FIGS. 1(a) and 1(b) perspective and side sectional views of the present invention, the *Modular Bottle-Mounted Gas Management System*.
Figure 1B:
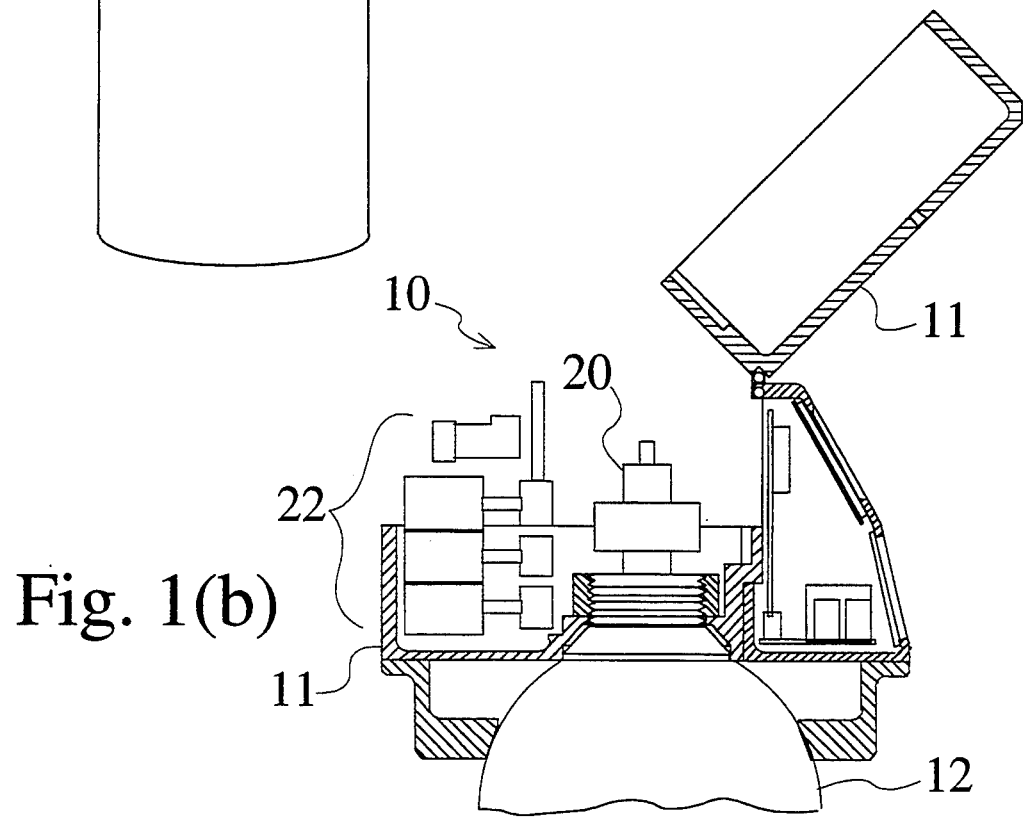

FIG. 1(a) is a perspective view of the *Modular Bottle-Mounted Gas Management System* 10. A housing 11 is affixed to a standard gas bottle 12. An upper control panel 13 contains an LCD display 14 and a lower control panel 15 holds a keypad control 16, a removable data pack 17, LED indicator lights 18, and an emergency shut-off switch 19. Within the housing 11, a bottle neck 20 protrudes up from the gas bottle 12 and provides a connection 20a for a supply of gas within it to a gas manifold 22. FIG. 1(b) is a sectional side view of the upper portion of the *Modular Bottle-Mounted Gas Management System* 10, which reveals the top portion of the hinged housing 11 swung open to provide easy access to the gas manifold 22 and to the bottle neck 20. The gas manifold 22 is an assembly of valves, actuators, pressure regulators, welded fittings, and transducers which are described below in great detail. The top of the housing 11 is fitted with a process gas outlet 21a, a vent connection 21b, a nitrogen inlet 21c, and a bottle access cover 21d.

Figure 2A:
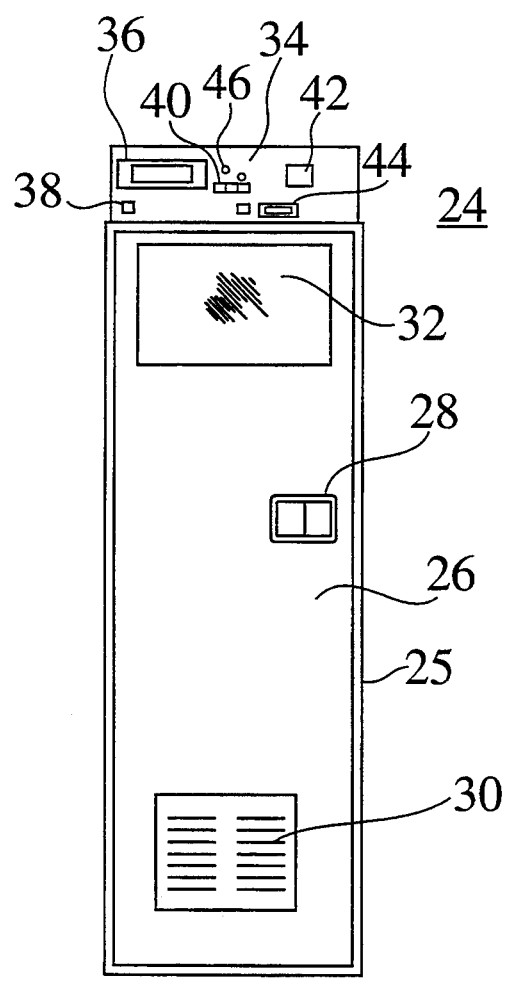
FIGS. 2(a) and 2(b) present from and side views of a conventional two bottle gas cabinet.
Figure 2B:
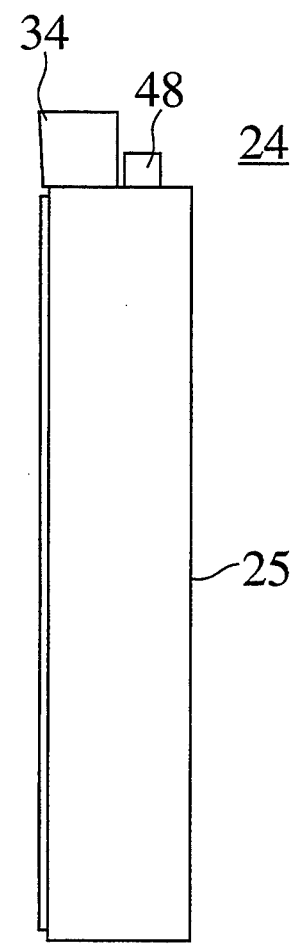

FIGS. 2(a) and 2(b) present front and side views of a conventional gas management system cabinet 24 which the *Modular Bottle-Mounted Gas Management System* 10 replaces. In sharp contrast to the present invention, which measures approximately eleven by ten by fourteen inches, the conventional gas management system 24 illustrated in FIG. 2 is roughly seven feet high, three feet wide, and over one foot deep. The older conventional gas management system 24 comprises a cabinet housing 25, a hinged door 26, a handle 28, and louvered inlet vents 30 which enable a constant negative pressure to be maintained within the cabinet housing 25. A window 32 affords a view to the hardware and gas bottles 12 contained inside the cabinet housing 25. A conventional control panel 34 includes a standard LCD display screen 36, an emergency stop switch 38, control switches 40, a keypad 42, a data pack 44, and LED indicator lights 46. An outlet vent 48 is mounted on top of the cabinet housing 25 behind the control panel 34.

Located within this conventional gas management system 24 is a large and complex network of valves, sensors, actuators, and transducers, mechanically connected through a manifold system in which to carry out the gas management functions. Construction methods used in these conventional gas management systems 24 rely heavily on swaged tubing assemblies between manifold components. Such construction systems suffer from a high parts count, and frequently have quality control problems in establishing and preserving leak-proof seals from the swaged joints.

In the assembly of these swaged tubing assemblies, it is not uncommon for assembly personnel to reverse internal beveled swage rings or backing rings, or to incorrectly tighten swaged components, or to incorrectly mix and match swaging hardware with fittings supplied by different manufacturers. Any of these assembly defects can cause process gas leakage from these swaged joints.

In the manufacture of intermediate tubing joints within a conventional gas management system 24, the use of bending fixtures and cutting jigs can introduce tolerance problems for the tubing components. These inconsistencies in tubing can introduce alignment problems for components in the manifold system. A "stack-up" of tolerances across a manifold assembly employing numerous components, tubing, and swaged fittings can lead to problems in alignment, making leak-proof assemblies difficult to achieve in practice.

When assembling a large, conventional manifold with numerous components, tubing connections, and swaged fittings, the tightening of one fitting in the assembly can affect the integrity of other connections within the assembly. This problem can also occur later, when the manifold is in service. Any adjustment, tightening, or movement to the manifold can introduce leakage to portions of the manifold assembly.

Figure 3:
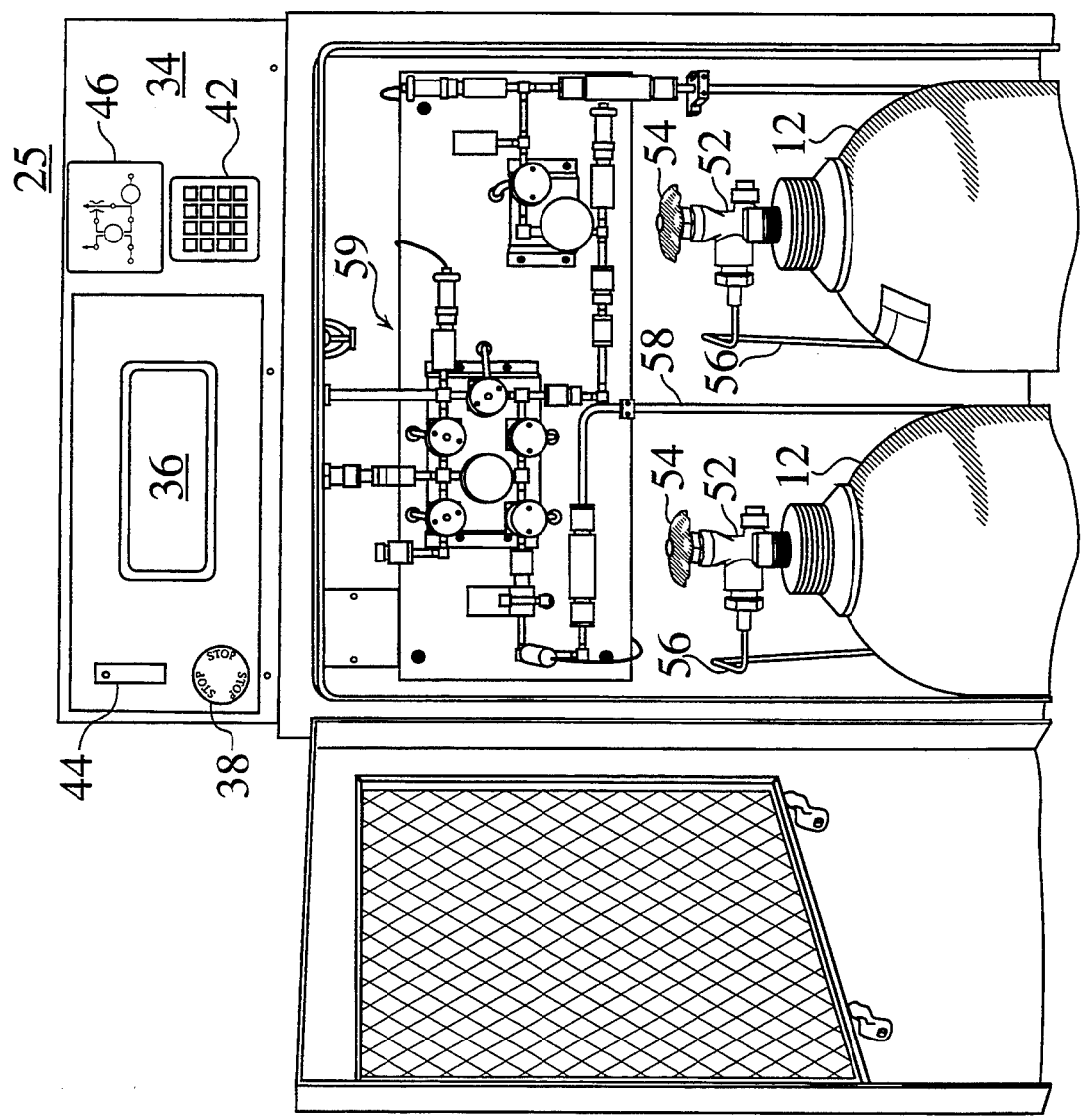
FIG. 3 depicts a two bottle gas cabinet with its door open, revealing the interior gas bottles and control mechanisms, as well as the component-to-component construction employed in the present invention.

FIG. 3 reveals a view of the advanced construction techniques employed by the present invention, as they would be implemented within a conventional gas cabinet housing 25, shown with the cabinet door 26 opened. Two gas bottles 12 which each have a standard bottle neck 52 and a valve handle 54 reside within the cabinet housing 25. An advanced gas manifold assembly 59 is located above the gas bottles 12 within the cabinet 25.

Figure 4:
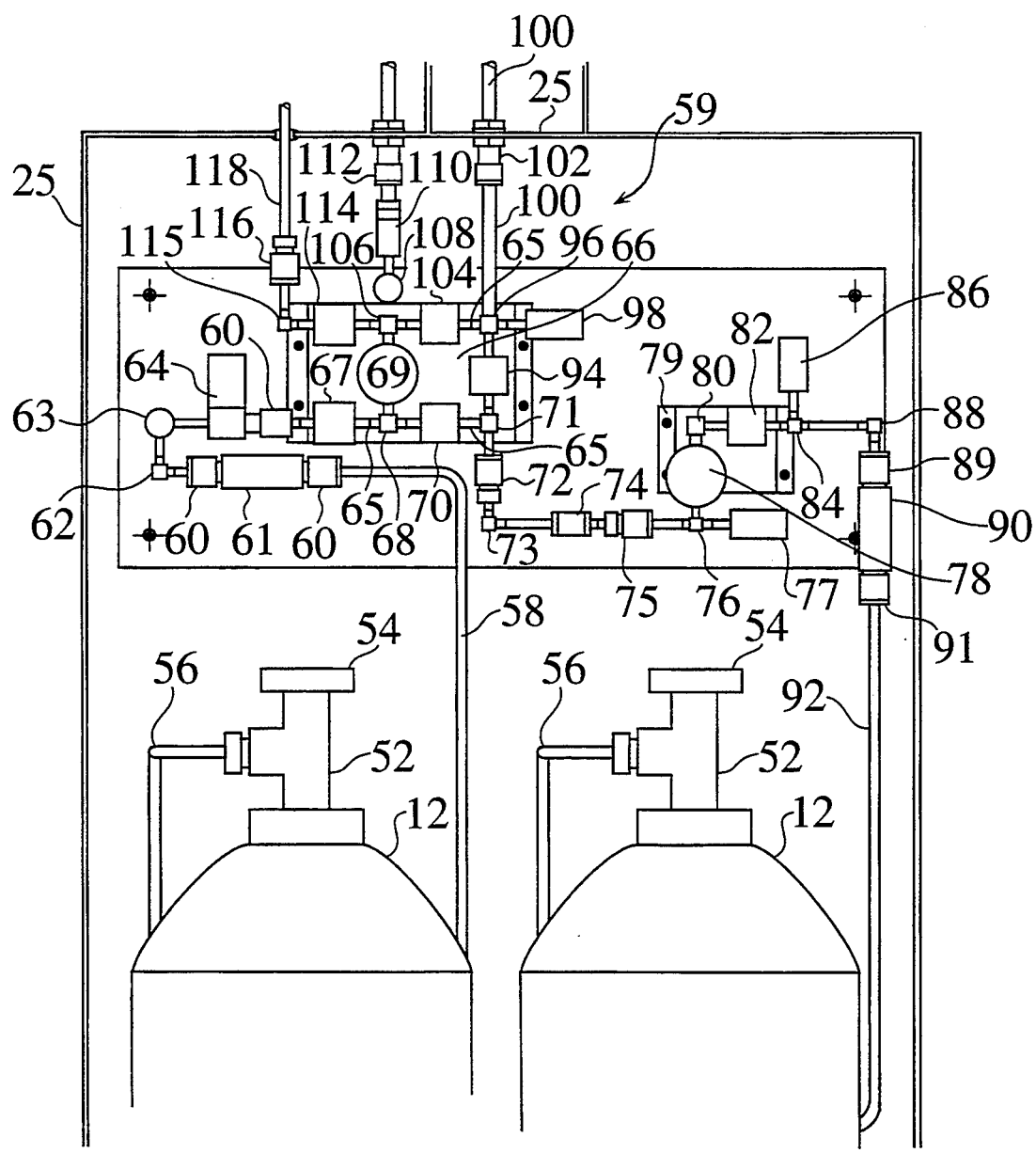
FIG. 4 is a detailed diagram of the gas bottles and control hardware for a conventional gas cabinet employing the construction methods of the present invention shown in FIG. 3.

FIG. 4 provides a detailed schematic view of the advanced gas manifold assembly 59 installed in a conventional gas management cabinet housing 25. The lower section of a process gas line 56 leads from the left gas bottle 12 to an upper portion of a process gas line 58 that is connected to the gas manifold assembly 59. A VCR-type connector 60 is connected in series to a filter 61, another VCR-type connector 60, a MicroFit cubical welding fitting 62, a transducer 63, an excess flow valve 64, and another VCR connector 60. A mounting plate 66 is affixed to the rear wall of the gas cabinet housing 25 and supports the central portion of the gas manifold assembly 59. A valve body 67 is attached to the lower left corner of the mounting plate 66. A valve body 67 is welded directly to a MicroFit fitting 68, using a component-to-component weld 65. The Microfit fitting 68 is also welded directly, using another component-to-component weld 65, to a pressure regulator 69 and to another valve body 70. The valve body 70 is welded in series to a MicroFit fitting 71, and is coupled to a VCR connector 72, another MicroFit fitting 73, a check valve 74, another VCR connector 75, another MicroFit fitting 76, and a terminal purge manifold pressure transducer 77. The MicroFit fitting 76 is also connected to a pressure regulator 78 which is supported by a mounting panel 79 that also bears a MicroFit fitting 80, a valve body 82, and another MicroFit fitting 84. The MicroFit fitting 84 is coupled to a transducer 86, another MicroFit fitting 88, a VCR connector 89, a filter 90, and a VCR connector 91 which leads to a gas line 92 that is connected to the right gas bottle 12.

A valve body 94 is attached to the right portion of the mounting plate 66 shown in FIG. 4. A MicroFit fitting 96 is connected to valve 94, a transducer 98, a vent line 100, and another valve 104. The vent line 100 passes through the housing 25 via a bulkhead connector 102. The valve body 104 is connected through a MicroFit fitting 106 to a transducer 108, an excess pressure relief valve 110, and a bulkhead connector 112. Fitting 106 is also coupled to a valve body 114, another MicroFit fitting 115, a VCR connector 116, and a process gas line 118 which leads to industrial equipment that utilizes the process gas.

The coupling methods employed between components in the advanced manifold assembly 59 consist primarily of welded, component-to-component weld joints 65. This type of construction significantly improves the integrity and minimizes the internal volume of the advanced gas manifold assembly 59.

Figure 5:
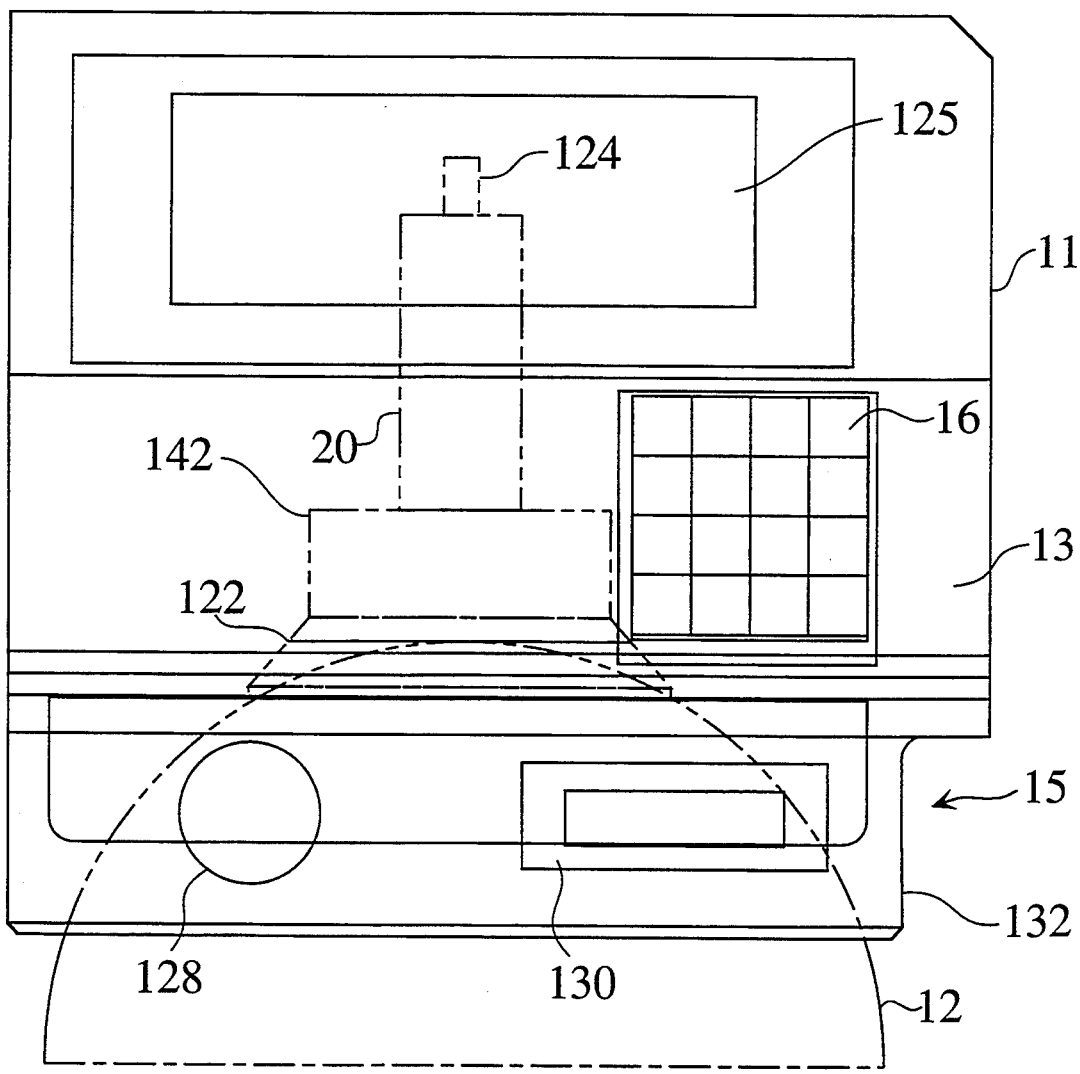
FIG. 5 is a front view of the *Modular Bottle-Mounted Gas Management System*.

FIG. 5 is a partial front view of one embodiment of the *Modular Bottle-Mounted Gas Management System* 10, which shows the housing 11 and the upper portion of the gas bottle 12 installed within it. The bottle neck 20 resides above a flange 122 and terminates in a valve stem 124. The keypad 16 is located on the upper control panel 13, and the emergency shut-off switch 128 and a data pack 130 are located on the lower control panel 15. The data pack 130 is a removable cartridge which includes an 8K-byte EEPROM data pack that stores information about the gas control procedure. The data pack 130 allows only qualified personnel to access purge cycling and maintains a constant log of cycling operations and operators. The housing 11 is held in place on the gas bottle 12 by supports 132.

Figure 6:
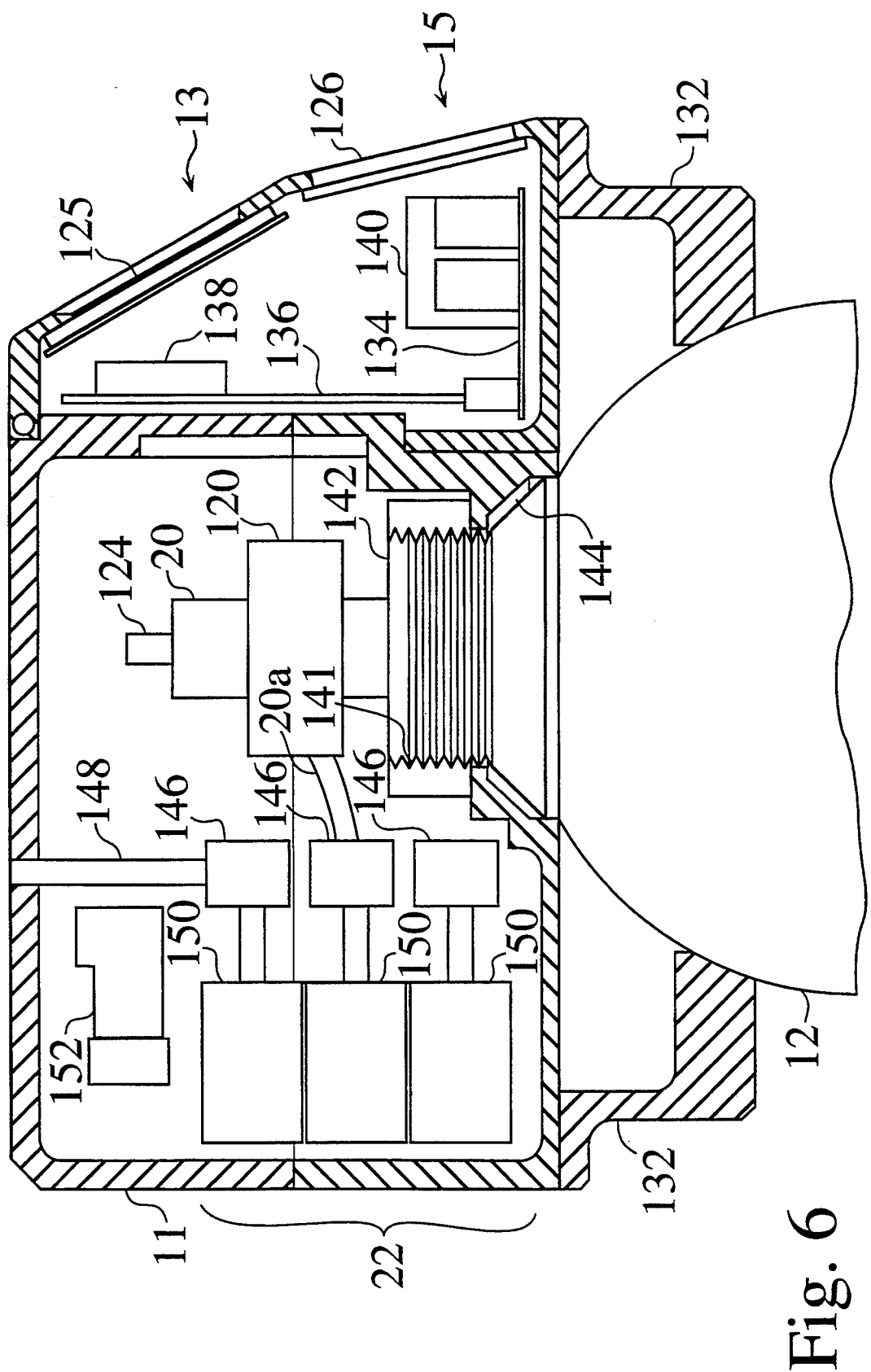
FIG. 6 is a sectional side view of the present invention.

FIG. 6 is a cut-away, side view of the *Modular Bottle-Mounted Gas Management System* 10. The right portion of the figure shows the LCD display 125 and the keypad control 126 in front of a chamber which houses a computer motherboard 134 and a stand-alone slave PC board 136 which hold a chip 138 and a transformer 140. Below the flange nut 120 on the bottle neck 20 of the gas bottle 12, a special nut 142 is secured over the threads 14 1. A gasket 144 maintains a tight seal between the housing 11 and the gas bottle 12. A set of valve bodies 146, an output line 148, actuators 150, and a three-way valve 152 are shown schematically behind the upper portion of the gas bottle 12.

Figure 7:
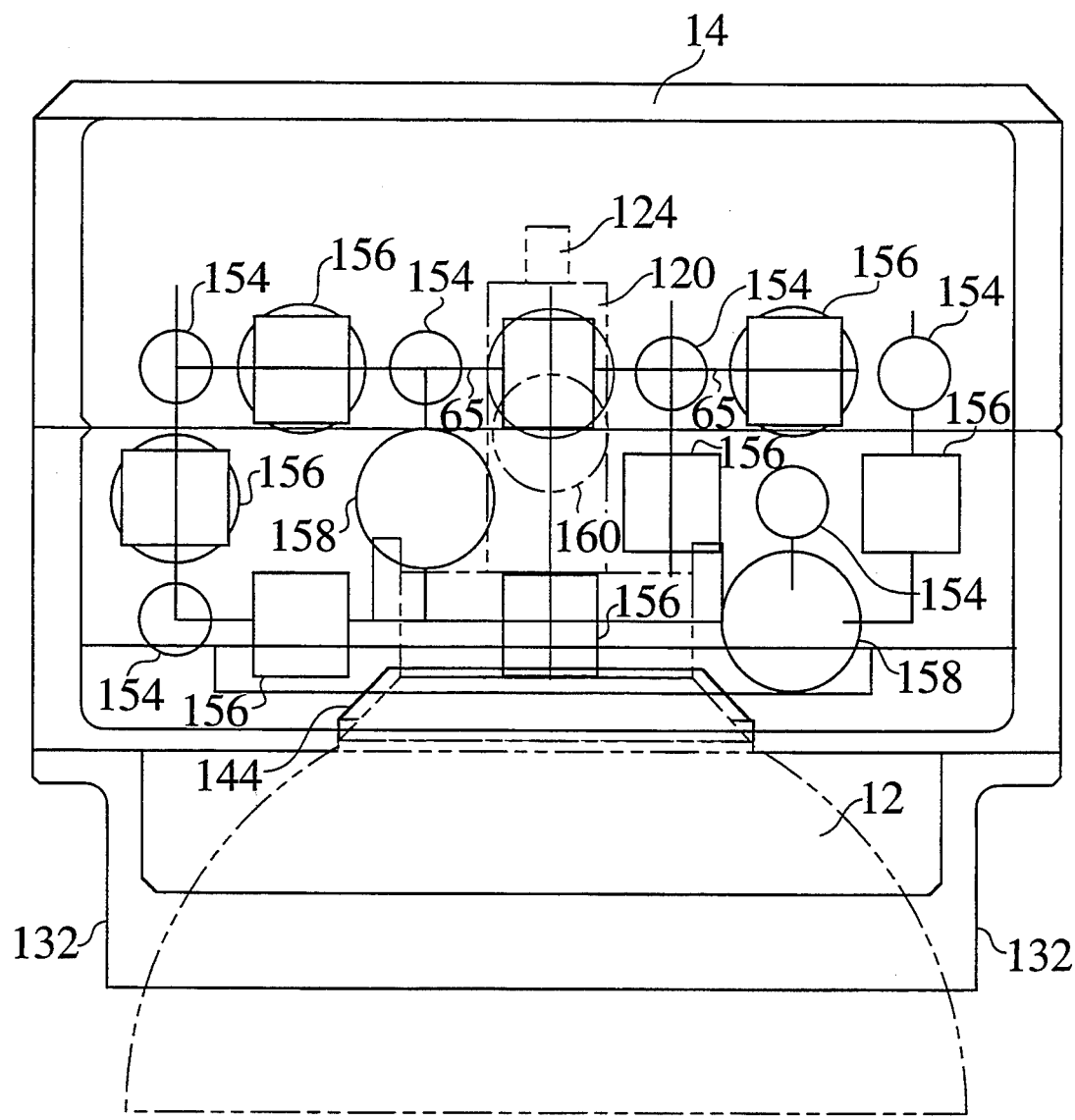
FIG. 7 is a rear view of the present invention, which reveals details of the component-to-component welded construction employed in the gas manifold.
Figure 8:
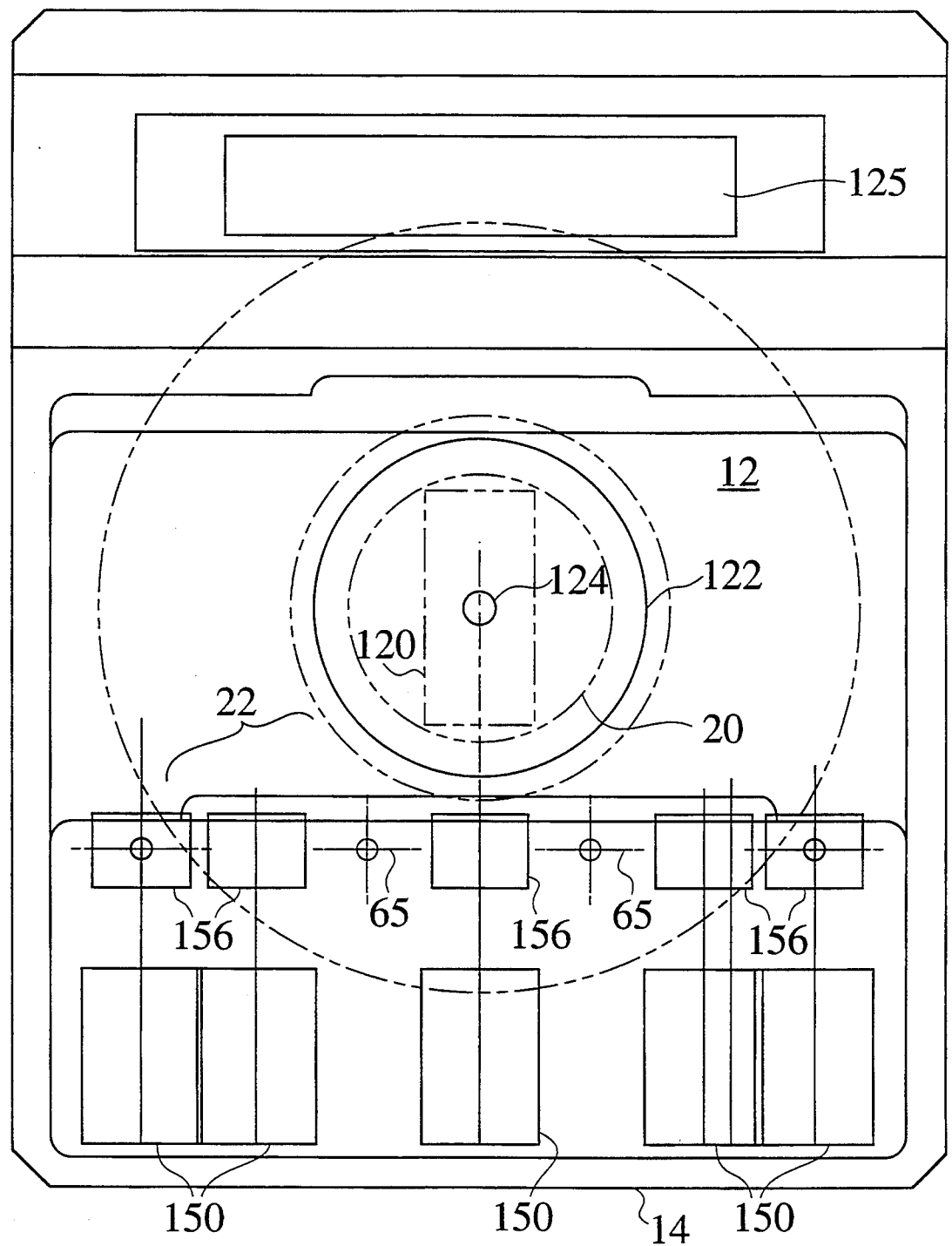
FIG. 8 is a top view of the *Modular Bottle-Mounted Gas Management System*.

FIG. 7 is a cut-away depiction of a rear view of the *Modular Bottle-Mounted Gas Management System* 10. An arrangement of pressure sensors 154, valve bodies 156, regulators 158, and a vacuum generator 160 are shown in a schematic presentation, as they would be advantageously assembled with component-to-component welds 65. Similarly, FIG. 8 is a top view of the present invention, which shows how the component-to-component welds 65 are used to minimize the size of the gas manifold 22. This reduces the volume of the process gas within the gas manifold 22, providing greater safety and fast response time for the gas manifold.

Figure 9:
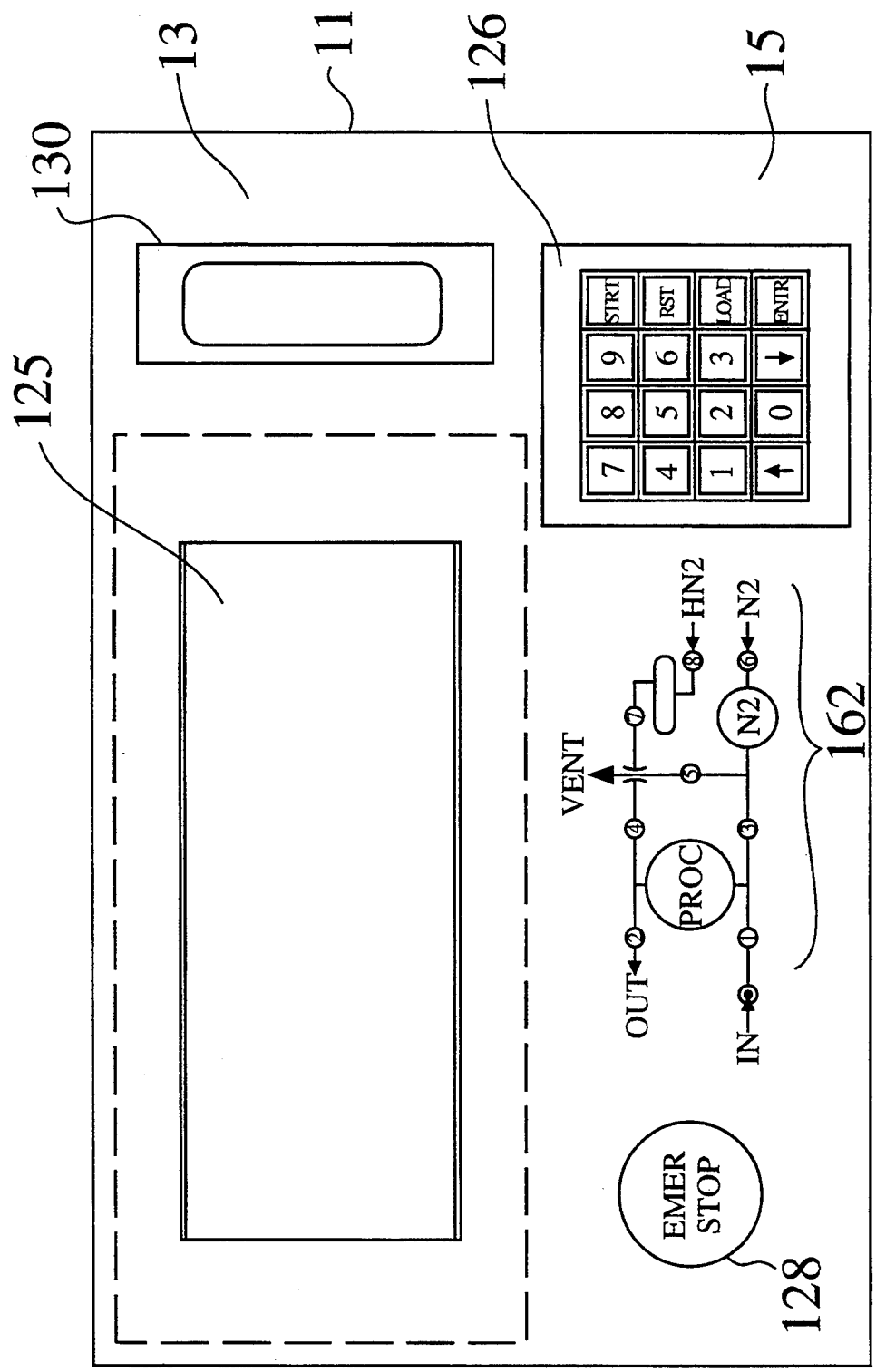
FIG. 9 is an illustration of the control panel of the present invention.

FIG. 9 is an illustration of an alternative embodiment of the upper and lower portions of the control panel 13 and 15. This version includes an eight line by forty character LCD display 125, a keypad 126, an emergency stop switch 128, a data pack 130, and a set of indicator lights 162.

FIGS. 10(a) and 10(b) portray the stand-alone slave PC board 136 inserted into the motherboard 134. A transformer 140 is depicted in the edge-on view presented by FIG. 10(b).

FIG. 11 (a) is a block diagram of the modular gas management system controller 164. Serial port A 166 and serial port B 168 are shown linked to optical fiber data links 170. Parallel port A 171 is coupled to keypad 172 and CPU 174. The CPU 174 is connected via a data bus 176 and an address bus 178 to a display 180, 8K-byte data pack EEPROM data pack 182, a SRAM 184, an EPROM 184, and a data acquisition system 188. The data acquisition system 188 is also connected to an atmospheric pressure sensor 190 and gas management system pressure sensors 192. Parallel port B 194 is coupled to valves 196. A third parallel port C 198 is connected to an alarm 200, a toxic gas sensor 202, an earthquake sensor 204, and counter timers 206.

Figures 11A, 11B:
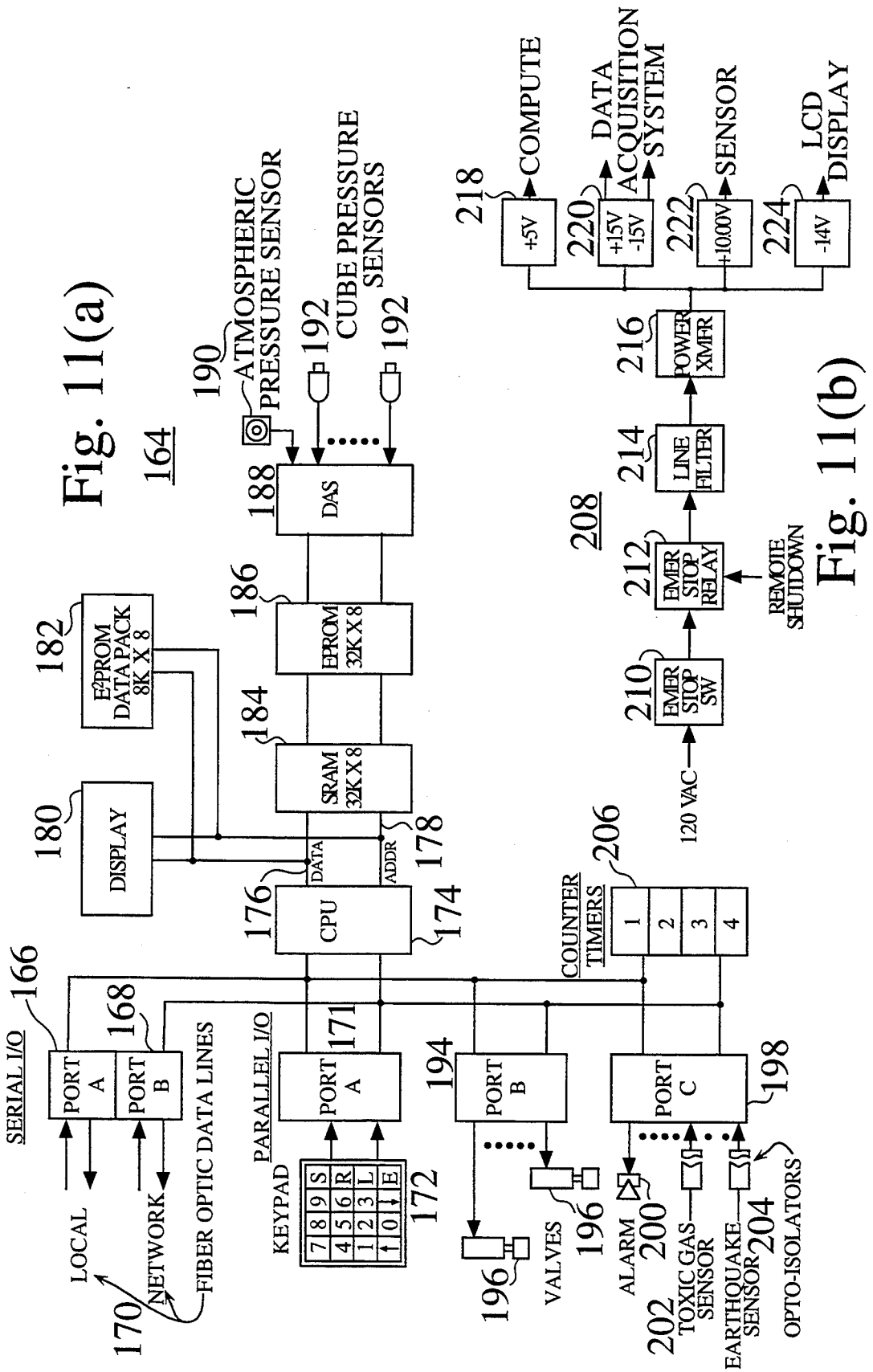
FIGS. 11(a) and (b) are block diagrams of the controller and power supply circuits within the *Modular Bottle-Mounted Gas Management System*.

FIG. 11(b) shows a power supply block diagram 208. An emergency stop switch 210 is connected in series to a relay 212, a line filter 214, and a power transformer 216, which has taps for the computer 218, the data acquisition system 220, sensors 222, and the LCD display 224.

Figure 12:
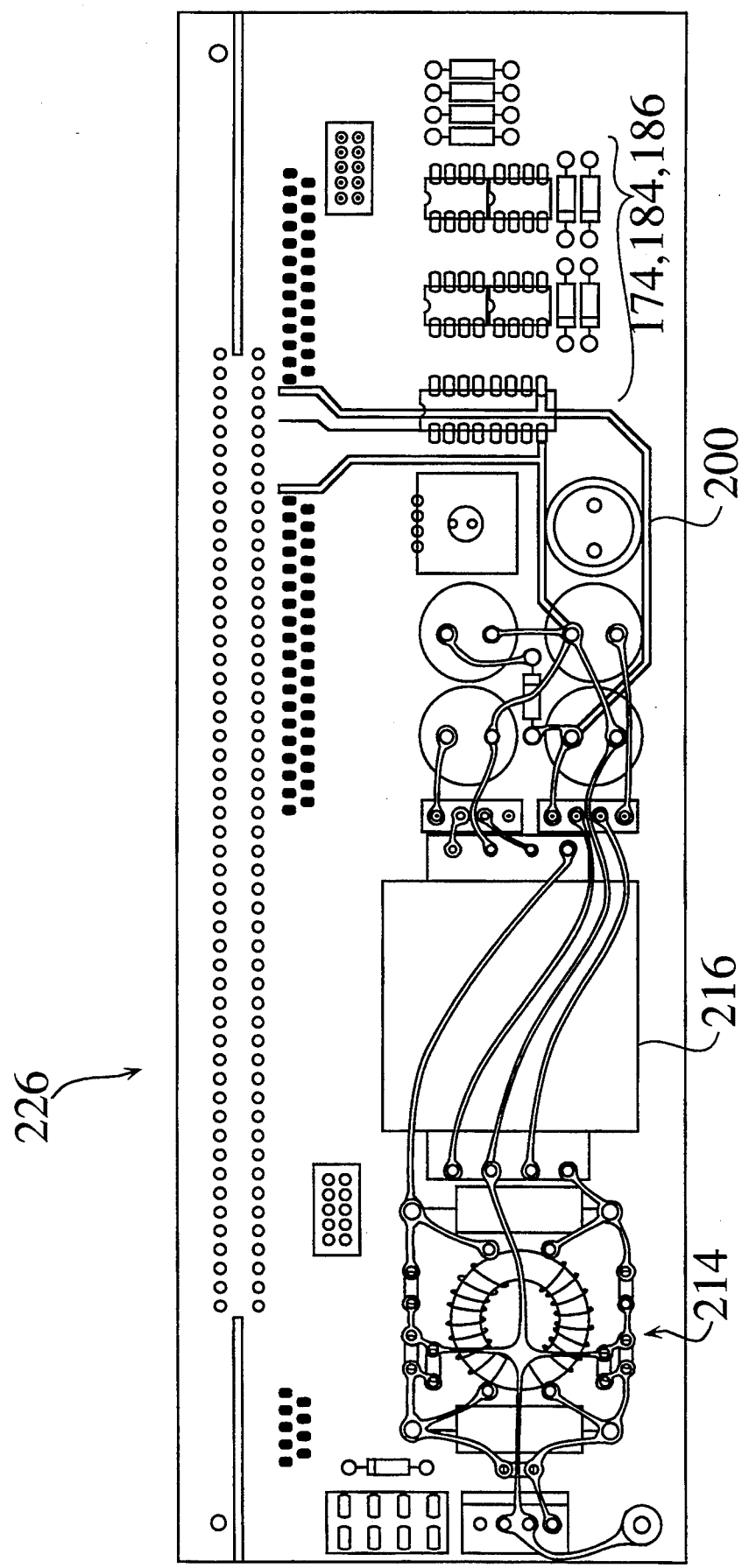

FIG. 12 is a top view of the layout of the stand-alone motherboard 226 comprising the line filter 214, the power transformer 216, the CPU 174 and memory SRAM 184 and EPROM 186.

The operation of the *Modular Bottle-Mounted Gas Management System* 10 is controlled by a complex computer program that is stored in memory. The CPU 174 constantly monitors the status of the gas transfer operations, and also provides self-diagnostic and leak-checking functions. An outline of the program which shows the automatic action implemented by the CPU 174 for each combination of valve states is contained in Table Two.

An alternate embodiment of the present invention, a Containerized Controller 228, is shown in FIG. 13(a).

While this embodiment employs many of the methods of construction featured in the bottle-mounted embodiment, the Containerized Controller 228 offers a slightly different feature set than the *Bottle Mounted Gas Management System* 10. The Containerized Controller 228 features the component-to-component welded construction 65 between the valves, actuators, pressure regulators, fittings and transducers that make up the gas manifold assembly 260. The modular Containerized Controller 228 is installed within an outer cabinet 230, and is able to provide gas management for one or more process or purge gas bottles located within the outer cabinet 230. This embodiment has distinct advantages of cost, size, and integrated control over conventional in-cabinet manifold methods. The Containerized Controller 228 also offers greater levels of containment, in that manifold hardware is located in a sealed outer case which is designed to operate in either a vacuum or a pressurized manner.

In FIG. 13(a), the Containerized Controller 228 is located within an outer cabinet 230. A process gas bottle 232 is also located within the outer cabinet 230, and is connected to the Containerized Controller 228 through a process gas supply line 234. A purge gas bottle 236 is also located inside the outer cabinet 230, and is connected to the Containerized Controller 228 through a purge gas supply line 238. The process gas supply line 234 and the purge gas supply line 238 use a "pig-tail" coiled construction technique to prevent alignment problems between the gas supply lines 234 and 238 and the Containerized Controller 228 or the gas bottles 232 and 236.

Further containment is achieved on both the process gas supply line 234 and the purge gas supply line 238, using containment vessels 240. Containment is achieved between the process gas bottle 232 and the Containerized Controller 228 by mounting a containment vessel 240 between them, which surrounds and provides containment around the process gas supply line 234. Containment is achieved in a similar fashion between the purge gas bottle 236 and the Containerized Controller 228, by mounting another containment vessel 240 between them, which surrounds and provides containment around the purge gas supply line 238. The containment vessels 240 have an evacuation passage way 243 that allows the containment vessels 240 to be atmospherically coupled to the Containerized Controller 228. The containment vessels 240 can therefore be evacuated and pressurized along with the Containerized Controller 228, through the evacuation passageway 243, thereby providing greater safety by preventing the escape of potentially hazardous or toxic process or purge gases.

FIG. 13(b) provides a perspective view of a containment half-shell 242. The containment vessel assembly 240 is constructed from two matching containment half shells 242, using suitable fastening and sealing techniques to provide a leak proof assembly.

FIGS. 13(c) and (d) reveal various embodiments of the containment half-shell 242, and illustrate how a containment half-shell 242 would be assembled with a matching containment half-shell 242. The resulting containment vessel assembly 240 is installed around a gas supply line 234 or 238 between a gas bottle 232 or 236 and the Containerized Controller 228.

Details of the Containerized Controller 228 are shown in FIGS. 14(a), 14(b), 14(c) and 14(d). FIG. 14(a) depicts a top view 244 of the Containerized Controller 228, which includes a container base 246, upon which a container cover 248 is installed. A container seal 250 is located between the container base 246 and container cover 248, to allow a leak-proof seal so that the resulting internal cavity 252 can be pressurized or evacuated. Contain fasteners 251 are located on the container cover 248. The container base 246 includes container mounting points 253. The materials and construction methods of the container base 246 and the container cover 248 are chosen for the application. FIG. 14(b) and 14(c) show a front view 254 and a side view 256 of the Containerized Controller 228.

FIG. 15(a) is a top sectional view 258 of the Containerized Controller 228 which reveals details of the gas manifold 260. The sealing surface 261 is created when the container cover 248 is connected to the container base 246 using the container seal 250. FIG. 15(c) provides a detailed sideview 322 of the Containerized Controller 228.

FIG. 15(b) reveals a front sectional view 262 of the Containerized Controller 228, from which details of the manifold 260 can be seen. The process gas inlet 264 enters the internal cavity 252 and is connected in series to a Microfit fitting 266, a process gas inlet high pressure transducer 268, a high pressure process gas inlet valve 270, and a second Microfit fitting 272. The purge gas inlet 274 also enters the internal cavity 252 and is connected in series a purge gas inlet 5high pressure transducer 276, a high pressure purge gas inlet valve 278, two Microfit elbow fittings 280, a purge gas regulator 282 coupled to a gas quality sensor 284, a purge gas low pressure Microfit elbow fitting 286, a purge gas low pressure transducer 288, and to a purge gas junction Microfit fitting 290. The purge gas junction fitting 290 is connected to a cavity purge valve 292, through which purge gas can be used to fill the internal cavity 252. The fitting 290 is also connected to second purge junction fitting 294. The junction fitting 294 is connected to purge gas low pressure venturi valve 296 and to the purge gas high pressure valve 298, which is connected in series to the second Microfit fitting 272. The purge gas venturi valve 296 is connected to a venturi vent junction Microfit fitting 300, to which is attached a vacuum generator pressure transducer 302 and a cavity evacuation valve 304. The vent junction fitting 300 is also connected to a low pressure purge gas outlet valve 306, and to the purge vent port 320. A process gas regulator 308 is connected to the second Microfit fitting 272, and is also connected to a process gas outlet Microfit junction 310. This junction 310 is connected to the low pressure purge gas outlet valve 306, and in series to a low pressure process gas outlet valve 312, a series of process gas outlet elbow fittings 314, a flow controller/flow meter 316, and a process gas outlet port bulkhead 318. The connections between the internal components of the Containerized Controller 228 are joined with component-to-component welds 65, which provide an extremely safe and reliable means to avoid process or purge gas leakage from the manifold 260. The Containerized Controller 228 provides an additional level to containment around this manifold 260, by providing the sealed internal cavity 252. This sealed cavity 252 can be automatically or manually evacuated and pressurized with a blanket of purge gas, which can be evacuated and vented to allow safe access to the manifold 260, should disassembly for inspection or service be required.

In a conventional gas management system, containment of process and purge gases near a standard swaged manifold assembly is only achieved by the single level of containment offered by the cabinet containment system. The extra degree of containment offered by the Containerized Controller 228 provides an extra level of safety for personnel against accidental exposure to highly toxic or caustic gases.

FIG. 16(a) reveals an electrically driven regulator mechanism 324 which is implemented within the Containerized Controller 228 to operate the purge gas regulator 282 and the process gas regulator 308. The regulator mechanism 324 is mounted on the purge gas regulator 282 and the process gas regulator 308. The regulator mechanism 324 is used to control the flow of purge gas through the purge gas regulator 282, and to control the flow of process gas through the process gas regulator 308.

The regulator mechanism 324 is shown as it would be connected to a standard valve body 326 of a purge gas regulator 282 or a process gas regulator 308. The regulator mechanism 324 consists of a sealed bulkhead penetration 328 that mounts to the valve body 326, an actuator 330 that is used to open and close the valve body 326, an actuator driver 332 that moves the actuator 330, and an actuator cover 334 that is threaded onto the bulkhead 328 to contain the actuator driver 332 and the actuator 330. FIG. 16(b) is a detailed cross-section of the sealed bulkhead 328. FIG. 16(c) is a side view of the actuator 330.

Figure 17:
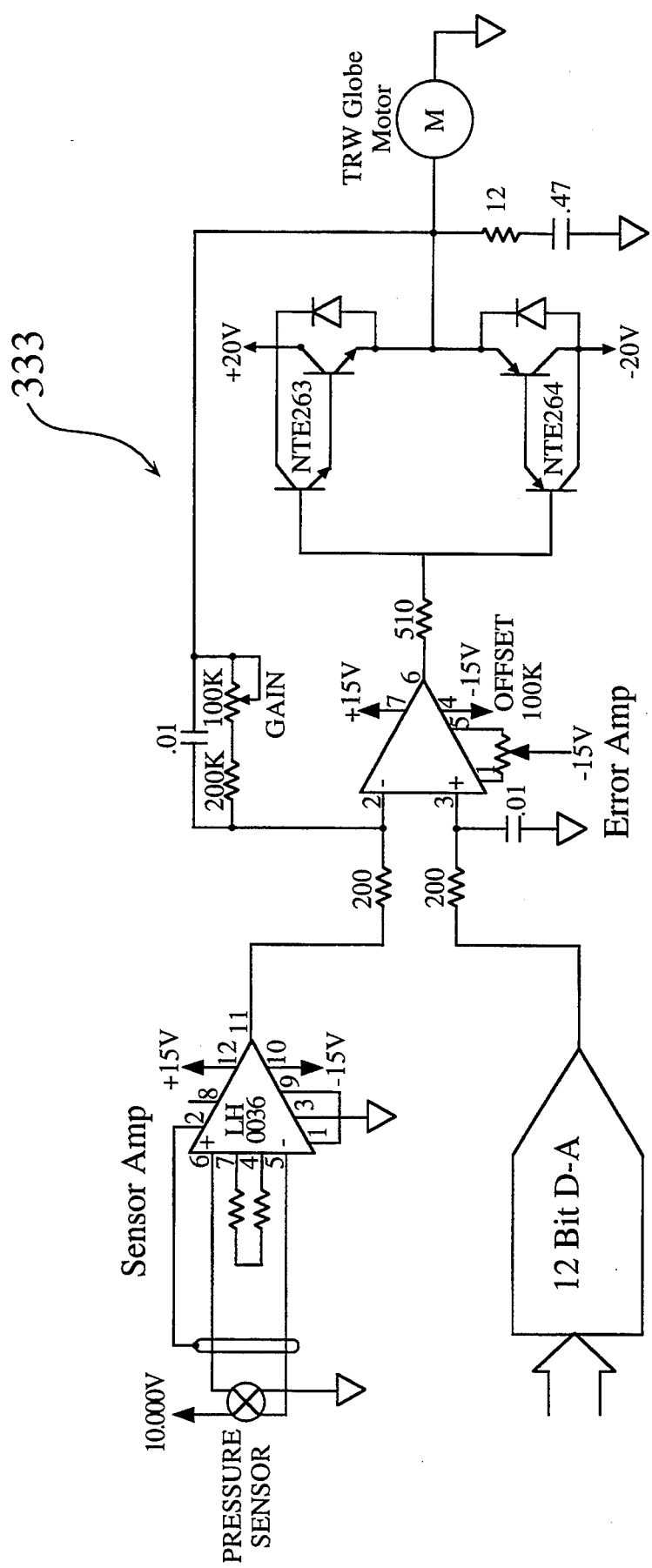
FIG. 17 shows the electronic configuration of a servo regulator circuit that is used in the present invention.

FIG. 17 is a schematic depiction of a servo regulator circuit 333 that is implemented in the Containerized Controller 228 to provide fast, automatic fail-safe control of the regulator mechanisms 324 that are used to operate the purge gas regulator 282 and the process gas regulator 308.

Figure 18:
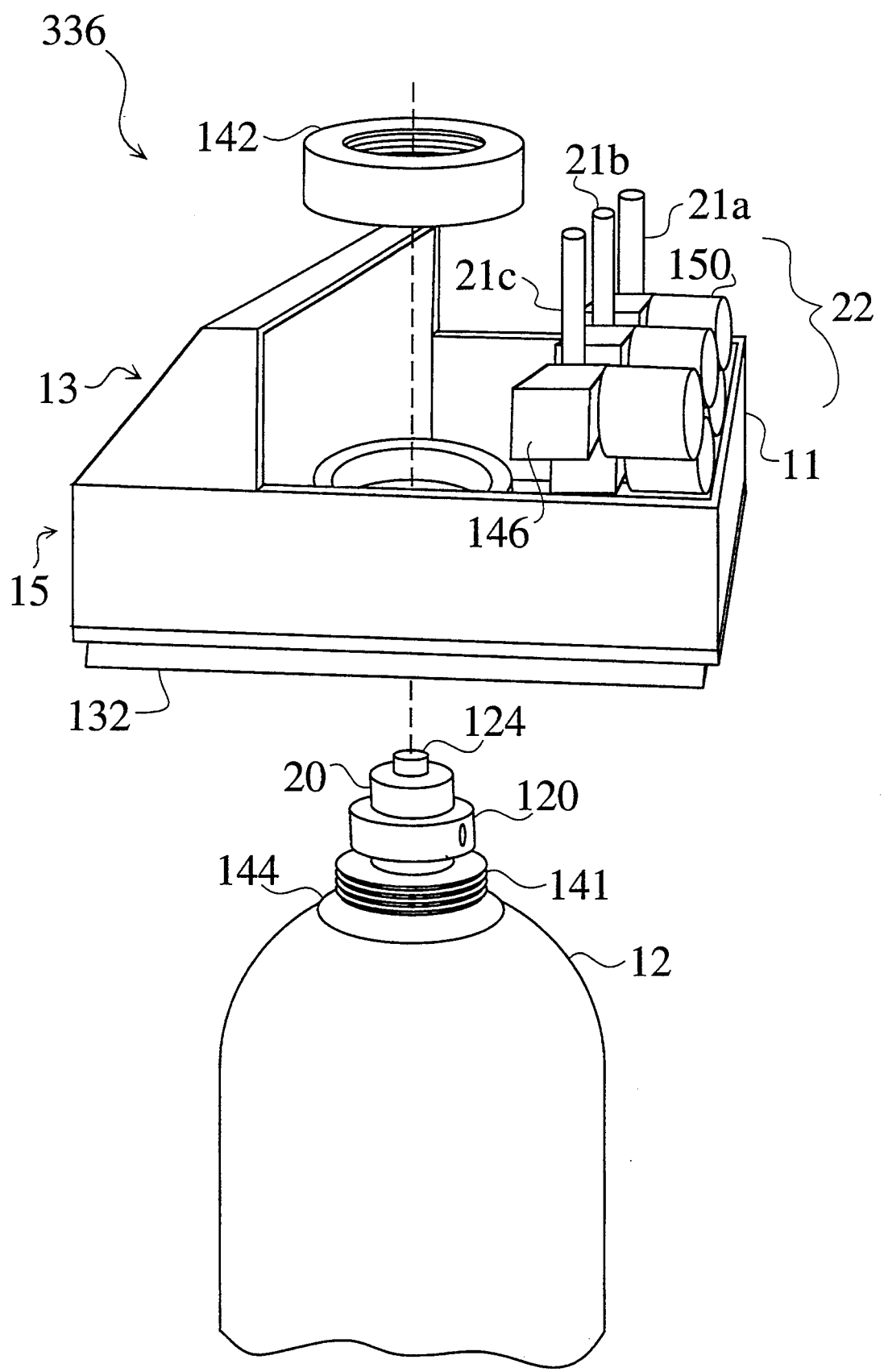
FIG. 18 is an expanded assembly view that shows how a gas bottle is attached to the present invention.

FIG. 18 is an expanded assembly view 336 of the *Bottle-Mounted Gas Management System* 10, which illustrates how a gas bottle 12 would be connected or disconnected. To install a gas bottle 12, the bottle 12 would be placed within an outer cabinet housing 25. Once the bottle 12 is securely in place, the gasket 144 is placed around the neck of the bottle. The *Bottle-Mounted Gas Management System* 10 would then be placed on top of the gas bottle 12, resting on the module support 132. The nut 142 is then threaded onto the gas bottle 12, thus securely attaching the gas bottle 12 to the housing 11. The flange nut 120 is then used to connect the gas bottle 12 to the manifold 22. Once the gas bottle 12 is installed, the housing 11 can be closed, and connections to the process, purge, and vent lines can be made through the process gas outlet connection 21a, the vent connection 21b, and the nitrogen purge gas inlet 21c. The cabinet housing 25 can then be closed, and the *Bottle-Mounted Gas Management System* 10 can be put into service.

Figure 19:
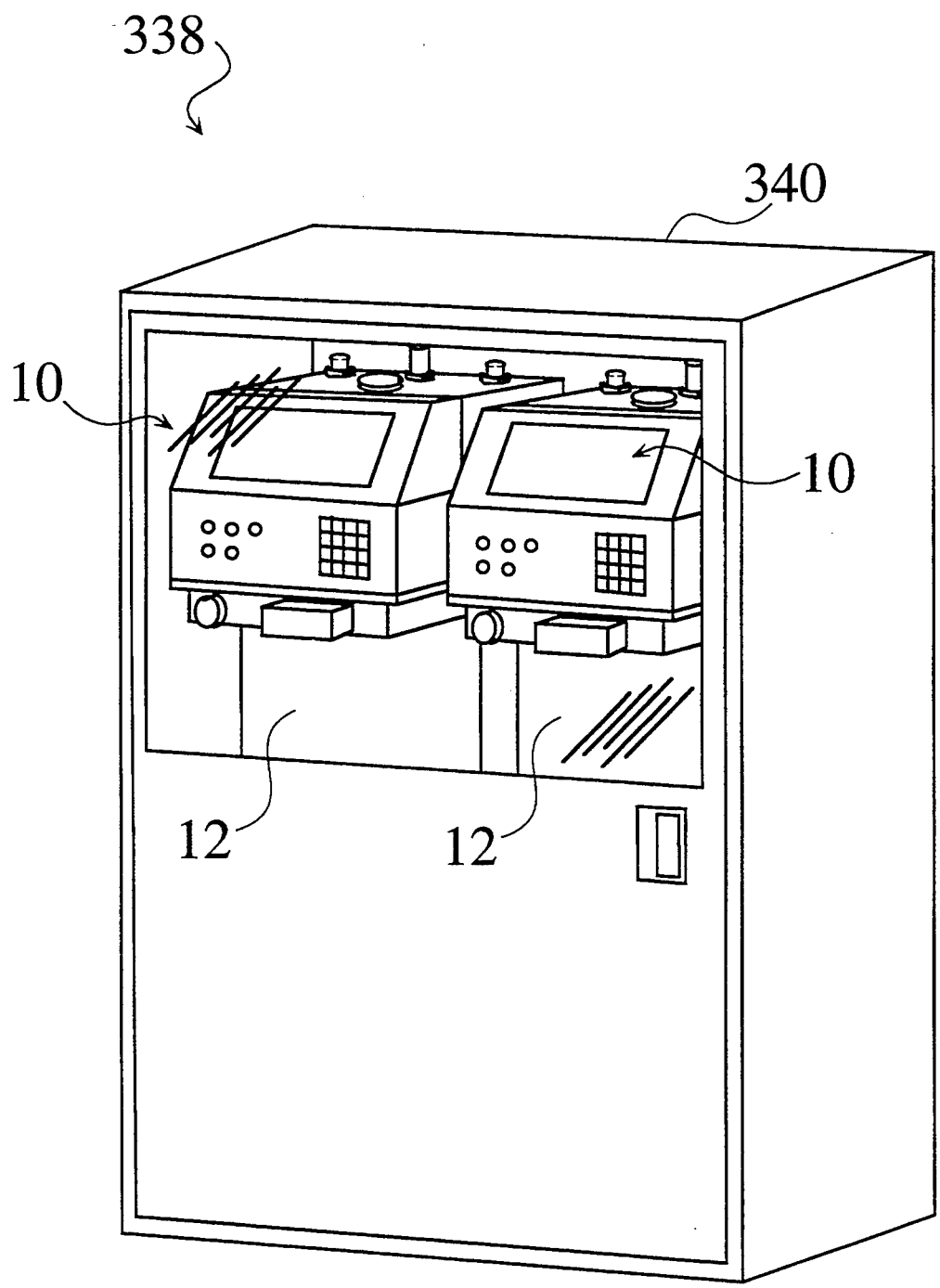
FIG. 19 is an illustration which shows two *Modular Bottle-Mounted Gas Management Systems* within a larger containment cabinet.

FIG. 19 is an illustration 338 that shows a pair of bottles 12 in a multiple containment structure 340 that are connected to a system employing the present *Modular Bottle-Mounted Gas Management System* 10. Application of this outer containment cabinet 340 provides an increased level of containment not seen in conventional gas management devices. As well, the light weight, *Modular Bottle-Mounted Gas Management System* 10 can be moved away from the gas bottles 12 readily when the gas bottles 12 are changed out, thereby protecting the hardware located within the cabinet housing 25 from damage.

Figure 20:
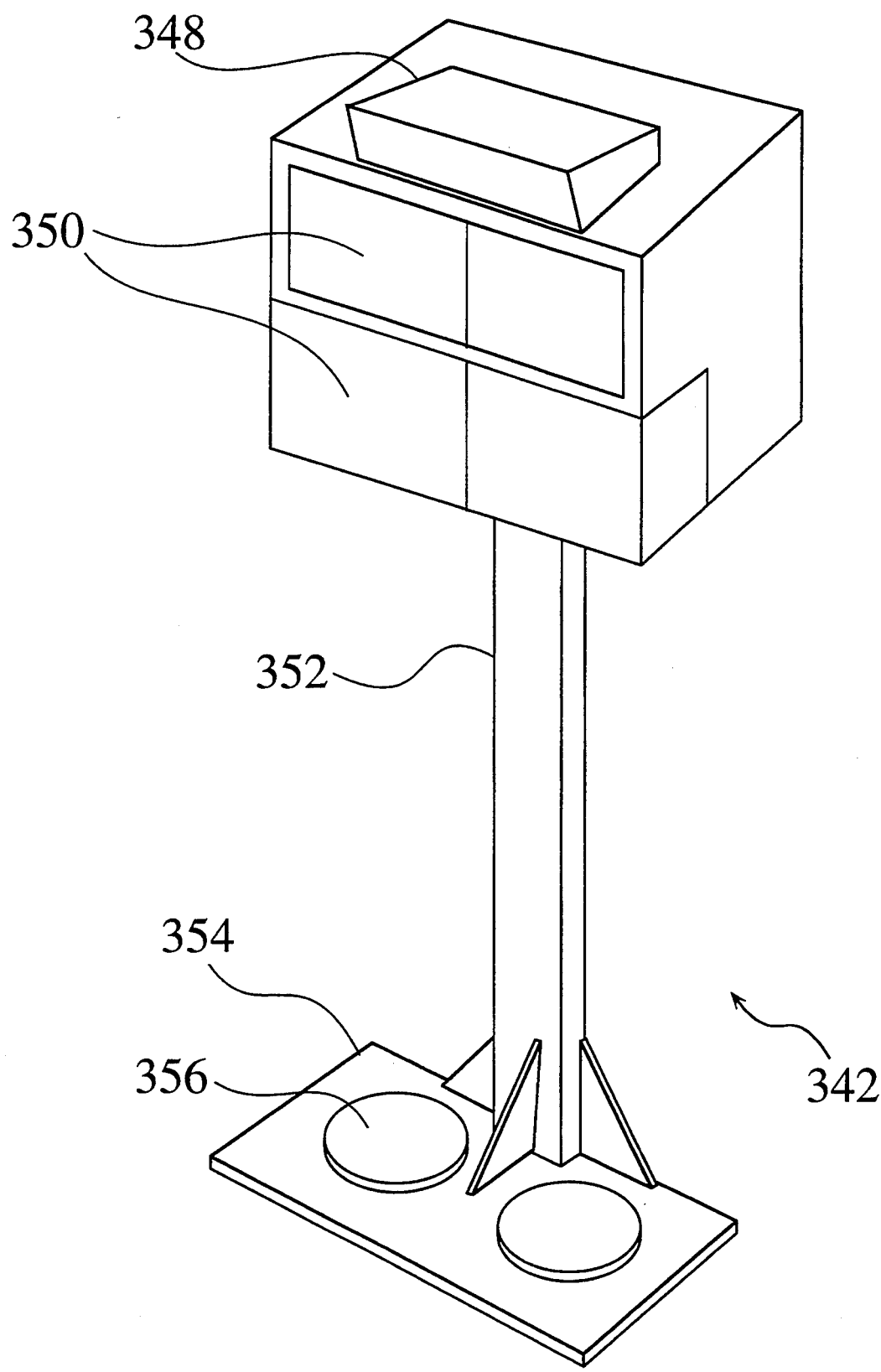
FIG. 20 depicts an alternate embodiment of the present invention, the Miniature Cabinet.
Figure 21:
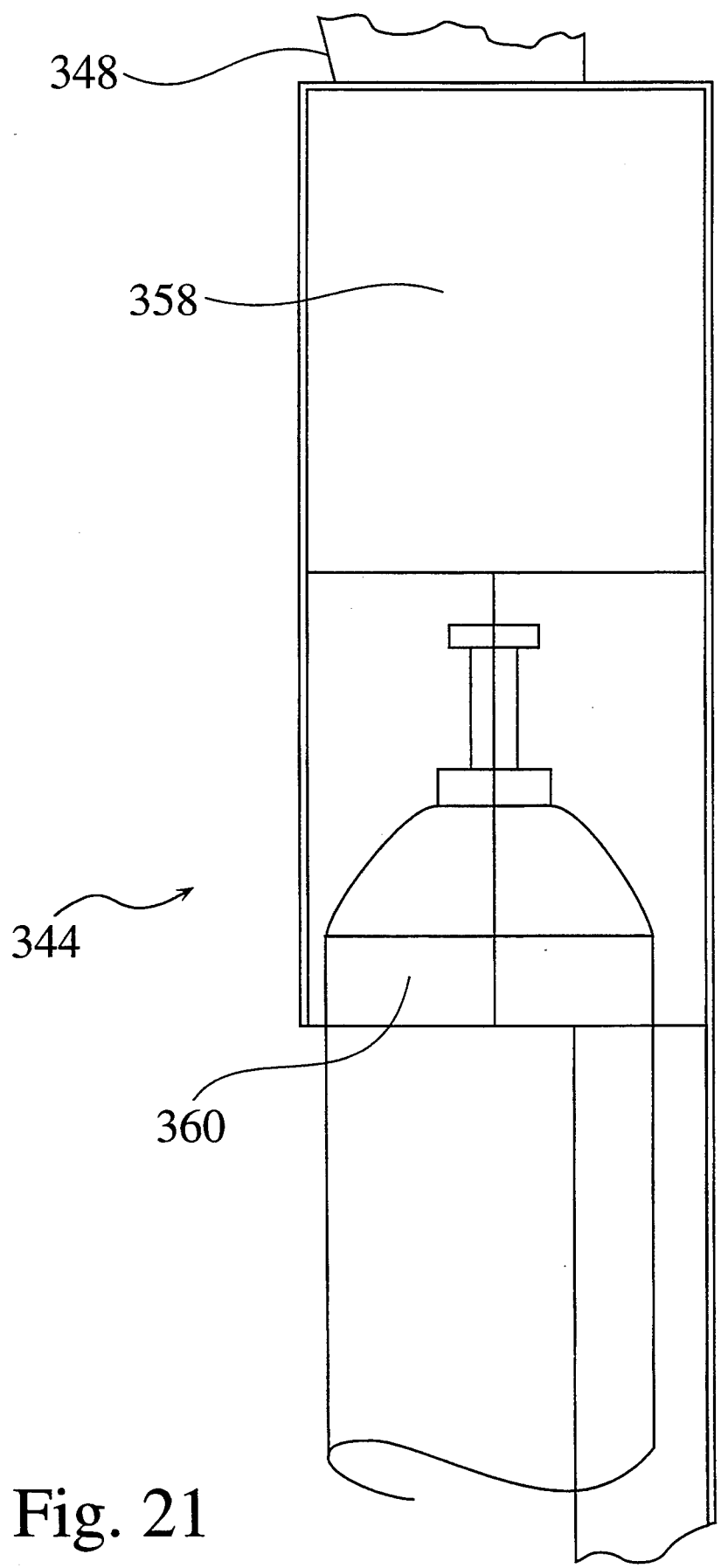
FIG. 21 is a side view of the Miniature Cabinet.
Figure 22:
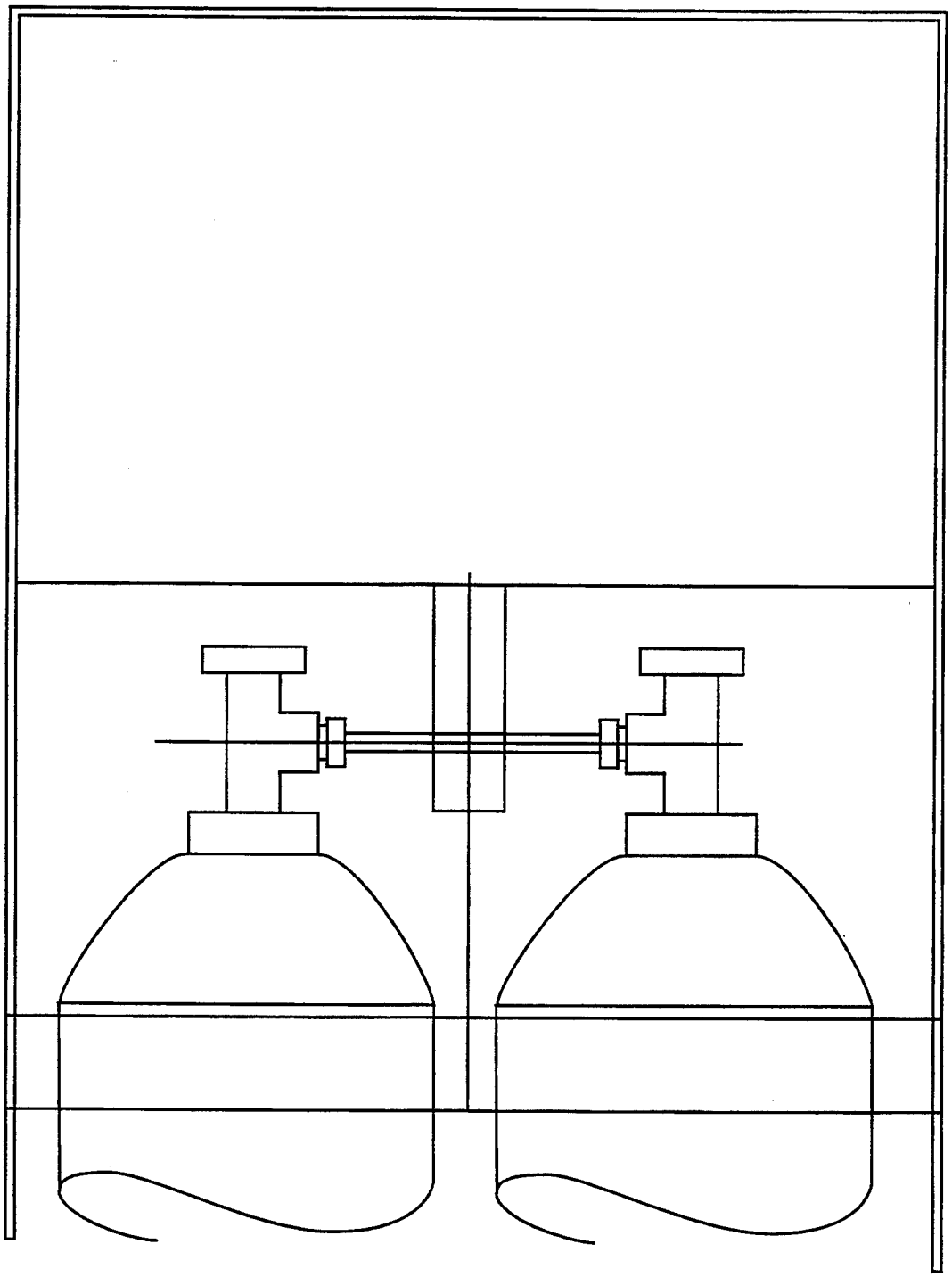
FIG. 22 is a detailed front view of the Miniature Cabinet.

FIG. 20 depicts an alternative embodiment of the present invention, a Miniature Cabinet 342 which includes a control 348, access doors 350, a stand 352, a base 354 and bottle jacks 356. FIG. 21 presents a side view 344 of the Miniature Cabinet 342, and shows control 348, plumbing 358 and a bottle seal and inlet vent 360. FIG. 22 provides a detailed view 346 of the Miniature Cabinet 342.

The present invention may be operated as a stand-alone unit or may be run from a remote computer. Although the specification has described the *Modular Bottle-Mounted Gas Management System* as a gas management system, it is capable of handling a wide variety of fluids, including liquids. Table One provides a list of some of the gases that may be regulated by the present invention.

TABLE ONE
TYPICAL APPLICATIONS

The five valve configuration of the gas cube allows compatibility with many types of gases: toxic, corrosive, pyrophoric and inert. Following is a list of typical gas applications:

| | | |
|---|---|---|
| $SiH_4$ | $Si_2H_6$ | $N_2O$ |
| $AsH_3$ | $C_3F_8$ | $NH_3$ |
| $HCl$ | $BCl_3$ | $BF_3$ |
| $PH_3$ | $SiH_2Cl_2$ | $HBr$ |
| $Cl_2$ | $HF$ | $H_2$ |
| $GeH_4$ | $WF_6$ | $N_2$ |
| $B_2H_6$ | $CHCl_3$ | $Ar$ |
| $NF_3$ | $SiCl_4$ | $SF_6$ |
| $H_2S$ | $SiCl_3$ | $He$ |
| $H_2Se$ | $CH_4$ | $O_2$ |
| | | $CCl_4$ |

TABLE Two

| Step | \multicolumn{7}{c}{Valves} | Action |

| Step | 0 | 1 | 2 | 3 | 4 | 5 | 6 | Action |
|---|---|---|---|---|---|---|---|---|
| | | | | | | | | Panel and Process In Purge Cycle |
| 0 | 0 | 1 | 1 | 0 | 0 | 0 | 0 | Operator inserts pack and keys loa |
| 1 | 0 | 1 | 1 | 0 | 0 | 0 | 0 | System displays cartridge program prompts for start or new pack |
| 1a | 0 | 0 | 0 | 0 | 0 | 0 | 1 | check for N2 supply pressure at SD |
| 2 | 0 | 0 | 0 | 0 | 0 | 0 | 1 | prompt operator to close bottle va |
| 3 | 0 | 0 | 0 | 0 | 0 | 1 | 1 | Start vacuum, hold for 2 sec If no vacuum goto lockout with message about no vacuum |
| 4 | 0 | 0 | 0 | 0 | 1 | 1 | 1 | 1 sec vacuum on panel |
| 5 | 0 | 1 | 0 | 0 | 1 | 1 | 1 | 1 sec vacuum on process in line |
| 6 | 1 | 1 | 0 | 0 | 1 | 1 | 1 | Check for vacuum on process in line If pressure on SB goto 2 |
| 7 | 1 | 1 | 0 | 0 | 1 | 1 | 1 | Set loop count |
| 8 | 1 | 1 | 0 | 0 | 1 | 1 | 1 | Hold vacuum for 2 sec |
| 9 | 1 | 1 | 0 | 1 | 1 | 1 | 1 | Open N2 flow |
| 10 | 1 | 1 | 0 | 1 | 0 | 1 | 1 | 2 sec flush with N2 |
| 11 | 1 | 1 | 0 | 0 | 0 | 1 | 1 | Dec loop count if non zero goto 8 |
| 12 | 0 | 0 | 0 | 0 | 0 | 0 | 0 | Do vacuum leak check for 15 sec if pressure on SB - Process in lea if pressure on SC - Panel leak if pressure goto lockout with an error message |
| 13 | 1 | 1 | 0 | 1 | 0 | 0 | 1 | Prompt operator to change process N2 flows until Sb shows pressure - or 5 min - goto 17 |
| 14 | 1 | 1 | 0 | 0 | 0 | 0 | 1 | check for pressure loss, 5 psi in |

TABLE Two-continued

| Step | 0 | 1 | 2 | 3 | 4 | 5 | 6 | Action |
|---|---|---|---|---|---|---|---|---|
| | | | | | | | | If loss at Sb message to re-do CGA connect and goto 13 |
| 15 | 1 | 1 | 0 | 0 | 1 | 1 | 1 | Vacuum system for 6 seconds |
| 16 | 0 | 0 | 0 | 0 | 0 | 0 | 0 | message to open gas bottle - goto |
| 17 | 0 | 0 | 0 | 0 | 0 | 0 | 0 | Lockout with no bottle, set alarm and message Bottle not connected, start to continue |
| 18 | | | | | | | | wait for start - if start goto 13 |
| 19 | 1 | 0 | 0 | 0 | 0 | 0 | 0 | SB sees pressure increase |
| 20 | 0 | 0 | 0 | 0 | 0 | 0 | 0 | SC sees pressure increase |
| 21 | 0 | 0 | 0 | 0 | 0 | 0 | 0 | System back in normal operation Display message |

| Valves | | Sensors | |
|---|---|---|---|
| 0 | Excess Flow valve | SA | Venturi |
| 1 | Unregulated Process in valve | SB | Unregulated process in |
| 2 | Regulated Process out valve | SC | Regulated process out a |
| 3 | N2 Purge valve | SD | Regulated N2 supply |
| 4 | Vacuum purge valve | SE | Unregulated N2 supply |
| 5 | N2 Venturi valve | | |
| 6 | Unregulated N2 valve | | |
| | 1 → Open valve 0 → closed v | | |

Purge Process Out Line Cycle

| Step | 0 | 1 | 2 | 3 | 4 | 5 | 6 | Action |
|---|---|---|---|---|---|---|---|---|
| 0. | 1 | 1 | 0 | 0 | 0 | 0 | 0 | Operator inserts pack and keys loa |
| 1 | 0 | 0 | 0 | 0 | 0 | 0 | 0 | System displays cartridge program prompts for start or new pack |
| 1a | 0 | 0 | 0 | 0 | 0 | 0 | 1 | check for N2 supply pressure at SD |
| 2 | 0 | 0 | 0 | 0 | 0 | 0 | 0 | prompt operator to close bottle va |
| 3 | 0 | 0 | 0 | 0 | 0 | 1 | 1 | Start Vacuum, hold for 2 sec If no vacuum goto lockout with message about no vacuum |
| 4 | 0 | 0 | 0 | 0 | 1 | 1 | 1 | 1 sec vacuum on panel |
| 5 | 0 | 1 | 0 | 0 | 1 | 1 | 1 | 1 sec vacuum on process in line |
| 6 | 1 | 1 | 0 | 0 | 0 | 1 | 1 | Check for vacuum on process in lin If pressure goto 2 |
| 7 | 1 | 1 | 0 | 0 | 1 | 1 | 1 | Set loop count |
| 8 | 1 | 1 | 0 | 0 | 1 | 1 | 1 | Hold vacuum for 2 sec |
| 9 | 1 | 1 | 0 | 1 | 1 | 1 | 1 | Open N2 flow |
| 10 | 1 | 1 | 0 | 1 | 0 | 1 | 1 | 2 sec flush with N2 |
| 11 | 1 | 1 | 0 | 0 | 0 | 1 | 1 | Dec loop count if non zero goto 8 |
| 12 | 0 | 0 | 0 | 0 | 0 | 0 | 0 | Do vacuum leak check for 15 sec if pressure on Sb - Process in lea if pressure on Sc - Panel leak if pressure goto lockout |
| 13 | 1 | 1 | 0 | 1 | 0 | 0 | 1 | Message 0k to disconnect gas bottl |
| 14 | 1 | 1 | 0 | 1 | 0 | 0 | 1 | wait for pressure drop on Sb loop until pressure drop or reset |
| 15 | 0 | 0 | 0 | 0 | 0 | 0 | 0 | |
| 16 | 0 | 0 | 0 | 0 | 0 | 1 | 1 | start vacuum |
| 17 | 0 | 0 | 0 | 0 | 1 | 1 | 1 | purge panel |
| 18 | | | | | | | | set loop count |
| 19 | 0 | 0 | 1 | 0 | 1 | 1 | 1 | purge for 2 sec |
| 20 | 0 | 0 | 1 | 1 | 1 | 1 | 1 | N2 flush for 100 msec |
| 21 | 0 | 0 | 1 | 1 | 0 | 1 | 1 | purge for 2 sec |
| 22 | 0 | 0 | 1 | 0 | 0 | 1 | 1 | dec loop count if non-zero goto 19 message Press reset when ready to purge the process out line |
| 23 | 0 | 1 | 1 | 0 | 0 | 0 | 1 | System under purge, loop until res and Sc shows |

TABLE Two-continued

| Step | \multicolumn{7}{c}{Valves} | Action |
| --- | --- | --- | --- | --- | --- | --- | --- | --- |
|  | 0 | 1 | 2 | 3 | 4 | 5 | 6 |  |
| 24 | 0 | 0 | 0 | 0 | 0 | 0 | 0 | pressure<br>reset and pressure on Sc |
| 25 | 0 | 0 | 0 | 0 | 0 | 1 | 1 | start vacuum |
| 26 | 0 | 0 | 0 | 0 | 1 | 1 | 1 | purge panel |
| 27 |   |   |   |   |   |   |   | set loop count |
| 28 | 0 | 0 | 1 | 0 | 1 | 1 | 1 | purge for 2 sec |
| 29 | 0 | 0 | 1 | 1 | 1 | 1 | 1 | N2 flush for 100 msec |
| 30 | 0 | 0 | 1 | 1 | 0 | 1 | 1 | purge for 2 sec |
| 31 | 0 | 0 | 1 | 0 | 0 | 1 | 1 | dec loop count<br>if non-zero goto 28 |
| 32 | 0 | 0 | 1 | 0 | 1 | 1 | 1 | apply vacuum to line for 2 sec |
| 33 | 0 | 0 | 0 | 0 | 0 | 0 | 1 | leak test for 15 sec<br>if no pressure increase on SC goto |
| 34 |   |   |   |   |   |   |   | send message Leak in Process out 1 |
| 35 |   |   |   |   |   |   |   | press start to continue<br>wait for start - if start goto 23 |
| 36 | 1 | 1 | 0 | 1 | 0 | 0 | 1 | Prompt operator to change process N2 flows until SB shows pressure - or 5 min - goto 40 |
| 37 | 1 | 0 | 0 | 0 | 0 | 0 | 1 | check for pressure loss, 5 psi in<br>If loss at SB msg to re-do CGA con |
| 38 | 1 | 1 | 0 | 0 | 1 | 1 | 1 | Vacuum system for 6 seconds |
| 39 | 0 | 0 | 0 | 0 | 0 | 0 | 0 | message to open gas bottle - goto |
| 40 | 0 | 0 | 0 | 0 | 0 | 0 | 0 | Lockout with no bottle, set alarm and message Bottle not connected, start to continue |
| 41 |   |   |   |   |   |   |   | wait for start - if start goto 36 |
| 42 | 1 | 0 | 0 | 0 | 0 | 0 | 0 | SB sees pressure increase |
| 43 | 1 | 1 | 0 | 0 | 0 | 0 | 0 | SC sees pressure increase |
| 44 | 0 | 1 | 1 | 0 | 0 | 0 | 0 | System back in normal operation<br>Display message |

| Valves |  | Sensors |  |
| --- | --- | --- | --- |
| 0 | Excess Flow Valve | SA | Venturi |
| 1 | Unregulated Process in valve | SB | Unregulated process in |
| 2 | Regulated Process out valve | SC | Regulated process out a |
| 3 | N2 Purge valve | SD | Regulated N2 supply |
| 4 | Vacuum purge valve | SE | Unregulated N2 supply |
| 5 | N2 Venturi valve |   |   |
| 6 | Unregulated N2 valve |   |   |

1 → Open valve   0 → Closed va

Panel Installation and Purge cycle

| Step | 0 | 1 | 2 | 3 | 4 | 5 | 6 | Action |
| --- | --- | --- | --- | --- | --- | --- | --- | --- |
| 0 | 0 | 1 | 1 | 0 | 0 | 0 | 0 | Operator inserts pack and keys loa |
| 1 | 0 | 1 | 1 | 0 | 0 | 0 | 0 | System displays cartridge program prompts for start or now pack |
| 3 | 0 | 0 | 0 | 0 | 0 | 0 | 1 | Check for N2 pressure on Sd if no pressure, msg No N2 pressure<br>wait for reset to begin again |
| 3 | 0 | 0 | 1 | 1 | 0 | 0 | 1 | purge Process out line with N2 |
| 4 | 0 | 0 | 1 | 0 | 0 | 0 | 1 | System under purge, loop until res and Sc shows pressure |
| 5 | 0 | 0 | 0 | 0 | 0 | 0 | 0 | reset and pressure on Sc |
| 6 | 0 | 0 | 0 | 0 | 0 | 1 | 1 | start vacuum |
| 7 | 0 | 0 | 0 | 0 | 1 | 1 | 1 | purge panel |
| 8 | 0 | 0 | 0 | 0 | 0 | 0 | 0 | set loop count |
| 9 | 0 | 0 | 1 | 0 | 1 | 1 | 1 | purge for 2 sec |
| 10 | 0 | 0 | 1 | 1 | 1 | 1 | 1 | N2 flush for 100 msec |
| 11 | 0 | 0 | 1 | 1 | 0 | 1 | 1 | purge for 2 sec |
| 12 | 0 | 0 | 1 | 0 | 0 | 1 | 1 | dec loop count<br>if non-zero goto 9 |
| 13 | 0 | 0 | 1 | 0 | 1 | 1 | 1 | apply vacuum to line for 2 sec |
| 14 | 0 | 0 | 0 | 0 | 0 | 0 | 1 | leak test for 15 sec<br>if no leak goto 17 |
| 15 |   |   |   |   |   |   |   | send message Leak in Process out 1 |
| 16 |   |   |   |   |   |   |   | press start to continue<br>wait for start - if start goto 4 |
| 17 | 1 | 1 | 0 | 1 | 0 | 0 | 1 | Prompt operator to change process N2 flows until Sb shows pressure - or 5 min - goto 20 |
| 18 | 1 | 0 | 0 | 0 | 0 | 0 | 1 | check for pressure loss, 5 psi in<br>If loss at Sb msg to re-do CGA con |
| 19 | 1 | 1 | 0 | 0 | 1 | 1 | 1 | Vacuum system for 6 seconds |
| 20 | 0 | 0 | 0 | 0 | 0 | 0 | 1 | message to open gas bottle - goto |
| 21 | 0 | 0 | 0 | 0 | 0 | 0 | 1 | Lockout with no bottle, set alarm and message Bottle not connected, start to continue<br>wait for start - if start goto 17 |
| 23 | 1 | 0 | 0 | 0 | 0 | 0 | 0 | SB sees pressure increase |
| 43 | 1 | 1 | 0 | 0 | 0 | 0 | 0 | SC sees pressure increase |
| 44 | 0 | 1 | 1 | 0 | 0 | 0 | 0 | System back in normal operation |
|   | 0 | 0 | 0 | 0 | 0 | 0 | 0 | Display message |

→ Open valve   0 → Closed valve

| Valves |  | Sensors |  |
| --- | --- | --- | --- |
| 0 | Excess Flow Valve efv | SA | Venturi vacuum-read |
| 1 | Unregulated Process in valve uregpi | SB | Unregulated process in uregpiread |
| 2 | Regulated Process out valve regpo | SC | Regulated process out a regporead |
| 3 | N2 Purge valve paneln2 | SD | Regulated N2 supply regn2read |
| 4 | Vacuum purge valve panelvac; | SE | Unregulated N2 supply uregn2read |
| 5 | N2 Venturi valve venturi |   |   |
| 6 | Unregulated N2 valve uregn2 |   |   |

CONCLUSION

Although the present invention was designed for use in the semiconductor fabrication business, the *Modular Bottle-Mounted Gas Management System* may be employed in a great number of industrial settings. As factory engineers and technicians seek better ways to manufacture products that require safe, reliable, and intelligent gas management systems, they will look to the technology and quality leaders who create innovative solutions that break through the barriers imposed by conventional equipment. The *Modular Bottle-Mounted Gas Management System* is just such an innovative solution that will revolutionize the gas management field.

Although the present invention has been described in detail with reference to a particular preferred embodiment, persons possessing ordinary skill in the art to which this invention pertains will appreciate that various modifications and enhancements may be made without departing from the spirit and scope of the claims that follow. The various gases and mechanical arrangements that have been disclosed above are intended to educate the reader about one preferred embodiment, and are not intended to constrain the limits of the invention or the scope of the claims.

LIST OF REFERENCE NUMERALS

10 Modular Bottle-Mounted Gas Management System
11 Housing
12 Gas bottle
13 Upper control panel
14 LCD Display
15 Lower control panel
16 Keypad control
17 Data pack
18 LED indicator lights
19 Emergency shut off switch
20 Bottle neck
20a Connection
21a a Process gas outlet
21b Vent connection
21c Nitrogen inlet
21d Bottle access cover
22 Gas manifold
24 Conventional gas management system
25 Cabinet housing
26 Hinged door
28 Handle
30 Negative pressure inlet louvers
32 Window
34 Conventional control panel
36 Standard LCD display screen
38 Emergency stop switch
40 Control switches
42 Keypad
44 Data pack
46 LED indicator lights
48 Outlet vent
52 Bottle neck
54 Valve handle
56 Lower section of process gas line
58 Upper portion of process gas line
59 Advanced gas manifold assembly
60 VCR connector
61 Filter
62 MicroFit fitting
63 Transducer
64 Excess flow valve
65 Component-to-component weld
66 Mounting plate
67 Valve body
68 MicroFit fitting
69 Pressure regulator
70 Valve body
71 MicroFit fitting
72 VCR connector
73 MicroFit fitting
74 Check valve
75 VCR connector
76 MicroFit fitting
77 Purge manifold pressure transducer
78 Pressure regulator
79 Mounting panel
80 MicroFit fitting
82 Valve body
84 MicroFit fitting
86 Transducer
88 MicroFit fitting
89 VCR connector
90 Filter
91 VCR connector
92 Gas line to second bottle
94 Valve body
96 MicroFit fitting
98 Transducer
100 Vent line
102 Bulkhead connector
104 Valve body
106 MicroFit fitting
108 Transducer
110 Excess pressure relief valve
112 Bulkhead connector
114 Valve body
115 MicroFit fitting
116 VCR connector
118 Process gas line out to equipment
120 Flange nut
122 Flange
124 Valve stem
125 LCD Display
126 Keypad
128 Emergency stop switch
130 Datapack
132 Support
134 Motherboard
136 Stand-alone slave PC board
138 Chip
140 Transformer
141 Threads
142 Nut
144 Gasket
146 Valve body
148 Output line
150 Actuator
152 Three-way valve
154 Pressure sensor
156 Valve body
158 Regulator
160 Vacuum generator
162 Indicator lights
164 Block diagram for gas management system controller
166 Serial port A
168 Serial port B
170 Optical fiber data links
171 Parallel port A
172 Keypad
174 CPU
176 Data bus
178 Address bus
180 Display
182 EEPROM data pack
184 SRAM
186 EPROM
188 Data acquisition system
190 Atmospheric pressure sensor
192 Gas management system pressure sensor
194 Parallel port B
196 Valve
198 Parallel port C
200 Alarm
202 Toxic gas sensor
204 Earthquake sensor
206 Counter timers
208 Block diagram for power supplies
210 Emergency stop switch
212 Relay
214 Line filter
216 Power transformer 218 Terminal to computer
220 Terminal to data acquisition system
222 Terminal to sensors
224 Terminal to LCD display
226 Top view of stand-alone motherboard
228 Containerized Controller
230 Outer cabinet
232 Process gas bottle
234 Process gas supply line
236 Purge gas bottle
238 Purge gas supply line
240 Containment vessel
242 Containment half shell
243 Evacuation passageway
244 Top view of Containerized Controller
246 Container base
248 Container cover
250 Container seal
251 Container fasteners
252 Internal cavity
253 Container mounting point
254 Front view of Containerized Controller
256 Side view of Containerized Controller
258 Top sectional view of Containerized Controller
260 Gas Manifold
261 Sealing surface
262 Front sectional view of Containerized Controller
264 Process gas inlet
266 Microfit fitting
268 Process gas inlet high pressure transducer
270 Process gas inlet valve
272 Second Microfit fitting
274 Purge gas inlet
276 Purge gas inlet high pressure transducer
278 High pressure purge gas inlet valve
280 Microfit elbow fittings
282 Purge gas regulator
284 Gas quality sensor
286 Purge gas low pressure Microfit elbow
288 Purge gas low pressure transducer
290 Purge gas junction Microfit fitting
292 Cavity purge valve
294 Second purge junction fitting
296 Purge gas low pressure venturi valve
298 Purge gas high pressure valve
300 Venturi vent junction Microfit fitting
302 Vacuum generator pressure transducer
304 Cavity evacuation valve
306 Low pressure purge gas outlet valve
308 Process gas regulator
310 Process gas outlet Microfit junction
312 Low pressure process gas outlet valve
314 Process gas outlet elbow fittings
316 Flow controller/flow meter
318 Process gas outlet port bulkhead
320 Purge gas vent port
322 Detailed side view of Containerized Controller
324 Regulator mechanism
326 Standard valve body
328 Sealed bulkhead penetration
330 Actuator
332 Actuator driver
333 Servo regulator circuit
334 Actuator cover
336 Expanded assembly view
338 Containment illustration
340 Multiple containment structure
342 Miniature Cabinet
344 Side view of Miniature Cabinet
346 Detailed front view of Miniature Cabinet
348 Control
350 Access doors
352 Stand
354 Base
356 BTL jack
358 Plumbing
360 Bottle seal and inlet vent

What is claimed is:

1. An apparatus for use in combination with a gas bottle (12) comprising:

a housing (11); said housing being adapted to mount directly on the top of said gas bottle (12);

said housing (11) having a gasket (144) for forming a seal between said gas bottle (12) and said housing (11);

a gas outlet (21a); said gas outlet (21a) extending through said housing a gas manifold (22); said gas manifold (22) being mounted within said housing (11);

said gas manifold (22) being capable of receiving gas directly from said gas bottle (12);

said gas manifold (22) being capable of controlling the flow of gas to said gas outlet (21a);

a purge gas inlet (21c) for receiving a purge gas to purge said housing (11) and said gas manifold (22); and a vent (21b) for venting said housing (11) and said gas manifold (22).

2. An apparatus as recited in claim 1, further comprising: a display (14) for monitoring the flow of said gas; said display (14) being mounted on said housing (11).

3. An apparatus as recited in claim 1, further comprising:

a keypad control (16) for entering commands to control the flow of said gas; said keypad control (16) being mounted on said housing (11).

4. An apparatus as recited in claim 11, further comprising:

a computer and memory (164, 208) for automatically controlling the flow of said gas; said computer and memory (164, 208) being coupled to said gas manifold (22), said display (14) and said keypad control (16).

5. An apparatus as recited in claim 1, further comprising:

a removable data pack (17) for controlling access to said computer and memory (164, 208) and to said keypad control panel (16); said removable data pack (17) being removably mounted in said housing (11).

6. An apparatus as recited in claim 1, further comprising:

an emergency shut-off switch (19); said emergency shut-off switch (19) being mounted on said housing (11).

7. An apparatus as recited in claim 1, in which said gas manifold (22) is assembled using component-to-component welds.

8. An apparatus as recited in claim 1, in which said housing (11) is capable of being evacuated and pressurized.

9. An apparatus as recited in claim 1 used in combination with a Containerized Controller 228.

* * * * *

UNITED STATES PATENT AND TRADEMARK OFFICE
CERTIFICATE OF CORRECTION

PATENT NO. : 5,440,477

DATED : August 8, 1995

INVENTOR(S) : Rohrberg et al.

It is certified that error appears in the above-indentified patent and that said Letters Patent is hereby corrected as shown below:

| | |
|---|---|
| Column 3, line 64: | Before "perspective", insert --provide--. |
| Column 4, line 27: | After "shown in", delete ".". |
| Column 7, line 40: | Before "EEPROM", delete "data pack". |
| Column 9, line 6: | "Contain" should be --Container--. |
| Column 9, line 27: | Before "inlet", delete ":". |
| Column 9, line 28: | After "in series", insert --to--. |
| Column 9, line 28: | Before "high", delete "5". |
| Column 18, line 40: | "11" should be --3--. |
| Column 18, line 47: | "1" should be --4--. |

Signed and Sealed this

Second Day of April, 1996

Attest:

BRUCE LEHMAN

Attesting Officer        Commissioner of Patents and Trademarks